(12) United States Patent
Muñoz De Diego et al.

(10) Patent No.: US 11,987,661 B2
(45) Date of Patent: May 21, 2024

(54) MODIFIED POLYMER POLYOLS

(71) Applicant: REPSOL, S.A., Madrid (ES)

(72) Inventors: César Muñoz De Diego, Móstoles (ES); Victoria Isabel Blasco Garcés, Móstoles (ES); Olivier Lemoine, Rouen (FR)

(73) Assignee: REPSOL, S.A., Madrid (ES)

( * ) Notice: Subject to any disclaimer, the term of this patent is extended or adjusted under 35 U.S.C. 154(b) by 1032 days.

(21) Appl. No.: 16/628,621

(22) PCT Filed: Jul. 6, 2018

(86) PCT No.: PCT/EP2018/068391
§ 371 (c)(1),
(2) Date: Jan. 3, 2020

(87) PCT Pub. No.: WO2019/008140
PCT Pub. Date: Jan. 10, 2019

(65) Prior Publication Data
US 2021/0130528 A1    May 6, 2021

(30) Foreign Application Priority Data

Jul. 7, 2017   (EP) .................................... 17382442

(51) Int. Cl.
| | | |
|---|---|---|
| C08G 18/08 | (2006.01) | |
| C08G 18/32 | (2006.01) | |
| C08G 18/40 | (2006.01) | |
| C08G 18/48 | (2006.01) | |
| C08G 18/66 | (2006.01) | |
| C08G 18/76 | (2006.01) | |
| C08G 79/02 | (2016.01) | |
| C08K 5/49 | (2006.01) | |
| C09K 21/12 | (2006.01) | |

(52) U.S. Cl.
CPC ..... C08G 18/0876 (2013.01); C08G 18/3275 (2013.01); C08G 18/409 (2013.01); C08G 18/4829 (2013.01); C08G 18/4841 (2013.01); C08G 18/6681 (2013.01); C08G 18/7621 (2013.01); C08G 79/02 (2013.01); C08K 5/49 (2013.01); *C08G 2110/0083* (2021.01)

(58) Field of Classification Search
CPC ............ C08G 18/0861; C08G 18/0876; C08G 18/6461; C08G 79/02
See application file for complete search history.

(56) References Cited

U.S. PATENT DOCUMENTS

| | | | | |
|---|---|---|---|---|
| 4,843,106 A | * | 6/1989 | Fis ......................... | C08K 5/49 |
| | | | | 521/137 |
| 6,117,937 A | * | 9/2000 | Matsumoto ........ | C08G 18/4072 |
| | | | | 521/170 |
| 9,550,856 B2 | * | 1/2017 | Cookson .............. | C08G 18/409 |
| 2009/0029043 A1 | | 1/2009 | Rong et al. | |
| 2010/0209613 A1 | | 8/2010 | Rong et al. | |
| 2011/0046305 A1 | | 2/2011 | Schubert et al. | |
| 2013/0203880 A1 | * | 8/2013 | George ................ | C08G 18/409 |
| | | | | 521/159 |
| 2016/0194431 A1 | | 7/2016 | Amici-Kroutilova et al. | |
| 2021/0189049 A1 | | 6/2021 | Munoz De Diego et al. | |
| 2021/0189053 A1 | | 6/2021 | Munoz De Diego et al. | |

FOREIGN PATENT DOCUMENTS

| | | |
|---|---|---|
| CN | 102838712 A | 12/2012 |
| CN | 105683237 A | 6/2016 |
| GB | 2040299 A | 8/1980 |
| WO | WO 92/02567 A1 | 2/1992 |

OTHER PUBLICATIONS

International Search Report and Written Opinion mailed Sep. 28, 2018 for Application No. PCT/EP2018/068391, 13 pages.
International Preliminary Report on Patentability mailed Jun. 24, 2019 for Application No. PCT/EP2018/068391, 6 pages.
Communication dated Jun. 16, 2020 forwarding the extended European Search Report for European Patent Application No. 19383166.6, 9 pages.
Communication date Jun. 19, 2020, forwarding the Extended European Search Report for European Patent Application No. 19383167.4, 7 pages.
ISO 16000-3 Internatonal standard; Indoor Air—Part 3: Determination of formaldehyde and other carbonyl compounds in indoor air and test chamber air—active sampling method; Oct. 15, 2011; 34 pages.
ISO 16000-9 Spanish standard; UNE-EN Indoor Air—Part 9: Determination of the emission of volatile organic compounds from building products and furnishing; Emission test chamber method (ISO 16000-9:2006); Nov. 2006; 24 pages.
ISO 16000-11 Spanish standard; UNE-EN Indoor Air—Part 11: Determination of the emission of volatile organic compounds from building products and furnishing; sampling, storage of samples and preparation of test specimens (ISO 16000-11:2006); Nov. 2006; 22 pages.
ASTM D-4274-16 International Standard Test Methods for testing polyurethane raw materials: Determination of hydroxyl numbers of polyols; 2017; 10 pages.
Standard UL 94; Test for flammability of plastic materials for parts in devices and appliances; May 22, 2001; ISBN 0-7629-0082-2; 52 pages.
Standard UL 94; Test for flammability of plastic materials for parts in devices and appliances; Mar. 28, 2013; revised Jun. 27, 2020; 42 pages.

(Continued)

*Primary Examiner* — Melissa A Rioja
(74) *Attorney, Agent, or Firm* — Squire Patton Boggs (US) LLP

(57) ABSTRACT

The present invention relates to new modified polymer polyols comprising at least one polyol and a stable dispersion of polymeric particles in the at least one polyol. The dispersed polymeric particles having a high content of P and N. There are also disclosed processes for the preparation of the herein described modified polymer polyols, and processes for preparing polyurethane materials containing them.

15 Claims, No Drawings

(56) References Cited

OTHER PUBLICATIONS

ISO 845 Spanish standard; UNE-EN Cellular plastics and rubbers Determination of apparent density (ISO 845:2006); Feb. 2010; 13 pages.
ISO 1856 Spanish standard; UNE-EN Flexible cellular polymeric materials Determination of compression set (ISO 1856:2018); Jun. 2019; 12 pages.
ISO 3386-1 Spanish standard; UNE-EN Polymeric materials, cellular flexible Determination of stress-strain characteristics in compression (ISO 3386-1:1986); Sep. 1998; 11 pages.
ISO 8307 Spanish standard; UNE-EN Flexible cellular polymeric materials Determination of resilience by ball rebound (ISO 8307:2018); Jun. 2019; 15 pages.

* cited by examiner

MODIFIED POLYMER POLYOLS

This application is a 35 U.S.C. 371 filing of International Application No. PCT/EP2018/068391, filed on Jul. 6, 2018, which claims priority to and the benefit of European Patent Application EP17382442.6 filed on Jul. 7, 2017, all of which are incorporated verbatim herein by reference in their entirety, including the specifications, drawings, and the claims.

The present disclosure relates to modified polymer polyols and methods for the preparation thereof. Since the modified polymer polyols of the present disclosure are useful in the preparation of polyurethane foams, the present disclosure also relates to polyurethane foams and foaming processes.

BACKGROUND ART

Polyurethane foams are prepared by reacting at least one polyol with a polyisocyanate in the presence of water and optionally one or more additives (e.g. a blowing agent, catalyst, and tensioactive products). In order to improve different foam properties, so-called modified polymer polyol products have been developed. Thus, in recent years an effort has been made to obtain modified polymer polyols, i.e. polyols containing additional polymeric material.

Different modified polymer polyols have been described in the art. For example, PHD polyols which are modified polymer polyols which comprise in a dispersed form the polycondensation reaction product of a polyamine, such as hydrazine, with a polyfunctional isocyanate; polymer polyols which comprise a polymer or a copolymer of an ethylenically unsaturated monomer at least partially grafted to the polyol such as SAN polyols (i.e. dispersion of vinyl polymer particles in a polyol); PIPA polyols which are dispersions of polyurethane and/or polyurethane-urea particles in a polyol, resulting from the polymerization of an olamine with an organic polyisocyanate in the presence of a polyol.

Recently, it has been described the preparation of polymer polyols comprising a polyether carbonate polyol as the base polyol, the polyether carbonate polyols (POPC) being obtainable by a process comprising copolymerizing one or more H-functional initiator substances, one or more alkylene oxides and carbon dioxide in the presence of a double metal cyanide catalyst (DMC). These POPC polyols may also be used in the preparation of polyurethane foams as described herein.

Despite the different known modified polymer polyols used in the preparation of polyurethane foams, which results in the obtention of foams with different desired properties; there still remains a need for new modified polymer polyols which, when used in the preparation of a polyurethane foam, will result in a polyurethane foam with specific properties improvement. Particularly the preparation of modified polymer polyols which used in the preparation of polyurethane foams result in foams with improved flame retardant properties.

In WO9202567 it is described a process for the preparation of a modified polymer polyol comprising polymerizing an olphosphine with a polyisocyanate in the presence of a polyol. It is mentioned that the modified polymer polyols thus obtained have inherent fire retardant and antioxidant properties.

On the other hand, in different documents, such as U.S. Pat. No. 3,248,429, there are mentioned previously known processes in which olphosphines are reacted with nitrogen-containing compounds and wherein the resulting liquid products are used for the impregnation of cellulosic materials to impart flame-proofing properties to the material being treated. The liquid products thus obtained have a high hydroxyl content. Other important disadvantage of the use of these liquid impregnating products is that they tend to migrate out of the impregnated material, thus affecting to the flame retardant properties, and being released to the surrounding air leading to human exposure.

A commercial technology, with about a 50-year history, is that based on tetrakis(hydroxymethyl)phosphonium salts (THPX) (wherein X is chloride, sulfate, phosphate, acetate and in general any suitable anion), which are water-soluble. The technology, known as Proban® process, is based on tetrakis(hydroxymethyl)phosphonium chloride (THPC) or tetrakis(hydroxymethyl)phosphonium sulfate (THPS) which is prereacted with urea and the solution is then adjusted to a pH 5-8 before padding onto cotton. The padding step is followed by drying and treating with gaseous ammonia the impregnated fibers. At this point, the structure of the cured product contains a network of N—$CH_2$—P linkages where the phosphorous is still in the lower (organophosphine) state of oxidation. The product can be stored in air to allow the phosphorus to become oxidized to the very stable phosphine oxide, or alternatively it can be treated with aqueous hydrogen peroxide to accomplish the oxidation. The resulting oxidized product contains a network of N—$CH_2$—P (=O)— linkages. The key fact is that the end product has no hydrolyzable links adjacent to the phosphorus, which is entirely in the very stable phosphine oxide structure.

A generally known approach to improve the fire retarding performance of polyurethane foams comprises the addition and/or impregnation with a fire retardant agent. Normal additive fire retardants include halogen phosphate, halogen-free phosphate esters such as dimethyl methanephosphonate, inorganic fire retardants such as ammonium polyphosphate (APP), encapsulated red phosphorus, expandable graphite, etc. Known additive fire retardants may result in problems such as low compatibility, mechanical performance, and decrease of the storage stabiliy.

Besides, liquid flame retardants commonly used in polyurethane foams such as mono- or di-chloropropylphosphates are becoming more and more a health and safety concern.

Therefore, in view of the known approaches to prepare polyurethane foams with flame-proofing properties, there exists a need for new developments which avoid the above mentioned disavantages.

SUMMARY

The inventors have found new modified polymer polyols comprising at least one base polyol and a stable dispersion of polymeric particles in the at least one base polyol, the modified polymer polyol being obtainable by a process comprising the preparation of the polymeric particles in the presence of at least one base polyol by a polycondensation reaction of: a) at least one compound bearing at least one basic-nitrogen atom characterized by the presence in the molecule of at least one hydrogen atom attached to a nitrogen atom; with b) at least one compound bearing a phosphorous atom selected from the group consisting of b1) a compound bearing a phosphine group and b2) a condensation product from at least one compound of formula (I) or at least one compound of formula (II) and at least one compound bearing at least one basic-nitrogen atom, wherein:

i) the at least one compound b1) is selected from the group consisting of at least one hydroxyalkylphosphine of formula (I), at least one hydroxyalkylphosphonium salt of formula (II), at least one hydroxyalkylphosphine oxide of formula (III) and a combination thereof; and ii) the at least one condensation product b2) is at least one condensation product from at least one hydroxyalkylphosphine of formula (I) or at least one hydroxyalkylphosphonium salt of formula (II) and at least one compound bearing at least one basic-nitrogen atom characterized by the presence in the molecule of at least one hydrogen atom attached to a nitrogen atom;

wherein

A) the hydroxyalkylphosphine of formula (I) is as follows:

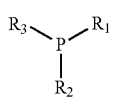

(I)

wherein $R_1$, $R_2$ and $R_3$ are each independently selected from H, linear or branched $(C_1-C_{18})$alkyl, $(C_3-C_{18})$cycloalkyl, linear or branched $(C_2-C_{18})$alkenyl, $(C_6-C_{18})$aryl, $(C_7-C_{18})$arylalkyl, linear or branched hydroxy$(C_1-C_6)$alkyl, $(C_7-C_{18})$alkylaryl and a radical of formula (IV)

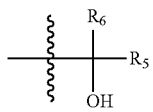

(IV)

wherein $R_5$ and $R_6$ are each independently selected from H, linear or branched $(C_1-C_{18})$alkyl, $(C_3-C_{18})$cycloalkyl, linear or branched $(C_2-C_{18})$alkenyl, $(C_6-C_{18})$aryl, $(C_7-C_{18})$arylalkyl, linear or branched hydroxy$(C_1-C_6)$alkyl, and $(C_7-C_{18})$alkylaryl; and the wavy line means the attachment point of the radical of formula (IV) to the phosphorus atom;

with the proviso that at least one of $R_1$, $R_2$ and $R_3$ is a radical of formula (IV);

B) the hydroxyalkylphosphonium salt of formula (II) is as follows:

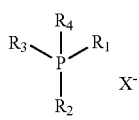

(II)

wherein $R_1$, $R_2$, $R_3$ and $R_4$ are each independently selected from H, linear or branched $(C_1-C_{18})$alkyl, $(C_3-C_{18})$cycloalkyl, linear or branched $(C_2-C_{18})$alkenyl, $(C_6-C_{18})$aryl, $(C_7-C_{18})$arylalkyl, linear or branched hydroxy$(C_1-C_6)$alkyl, $(C_7-C_1)$alkylaryl and a radical of formula (IV):

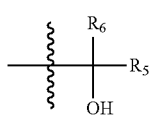

(IV)

wherein $R_5$ and $R_6$ are each independently selected from H, linear or branched $(C_1-C_{18})$alkyl, $(C_3-C_{18})$cycloalkyl, linear or branched $(C_2-C_{18})$alkenyl, $(C_6-C_{18})$aryl, $(C_7-C_{18})$arylalkyl, linear or branched hydroxy$(C_1-C_6)$alkyl, and $(C_7-C_{18})$alkylaryl; and the wavy line means the attachment point of the radical of formula (IV) to the phosphorus atom; and X— represents any anion suitable for compensating the positive charge of the phosphonium cation;

with the proviso that at least one of $R_1$, $R_2$, $R_3$ and $R_4$ is a radical of formula (IV); and C) the hydroxyalkylphosphine oxide of formula (III) is as follows:

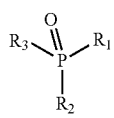

(III)

wherein $R_1$, $R_2$ and $R_3$ are each independently selected from H, linear or branched $(C_1-C_{18})$alkyl, $(C_3-C_{18})$cycloalkyl, linear or branched $(C_2-C_{18})$alkenyl, $(C_6-C_{18})$aryl, $(C_7-C_{18})$arylalkyl, linear or branched hydroxy$(C_1-C_6)$alkyl, $(C_7-C_{18})$alkylaryl and a radical of formula (IV):

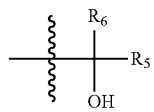

(IV)

wherein $R_5$ and $R_6$ are each independently selected from H, linear or branched $(C_1-C_{18})$alkyl, $(C_3-C_{18})$cycloalkyl, linear or branched $(C_2-C_{18})$alkenyl, $(C_6-C_{18})$aryl, $(C_7-C_{18})$arylalkyl, linear or branched hydroxy$(C_1-C_6)$alkyl, and $(C_7-C_{18})$alkylaryl; and the wavy line means the attachment point of the radical of formula (IV) to the phosphorus atom;

with the proviso that at least one of $R_1$, $R_2$ and $R_3$ is a radical of formula (IV);

and wherein the compound bearing at least one basic-nitrogen atom is selected from those compounds of formula (V) or formula (VI);

wherein the compounds of formula (V) are as follows

(V)

wherein $R_7$ is —H, —$(C_1-C_3)$Alkyl, $(C_1-C_3)$Alkyl-CO—, $NH_2$—CO—, —$(CH_2)_n$—$NH_2$, —CN, —$NH_2$, —$SO_2NH_2$, cyclohexyl, phenyl, —$SO_2OH$ or —$NHCONHNH_2$; wherein n is an integer from 1-18;

and the compounds of formula (VI) are as follows:

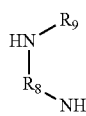

(VI)

wherein $R_8$ is selected from NH=C<, and O=C<; S=C<; and $R_9$ is selected from H, —CN, —$NH_2$, —$CONH_2$, —$CONHCONH_2$, and —$CONHCONHCONH_2$.

The modified polymer polyols as described in the present disclosure are useful in the preparation of polyurethane foams, adhesives, elastomers, sealings and coatings with flame retardant properties, at the same time that avoid the known disavantages of the commonly used flame retardant additives used in the art.

One of the advantages of the modified polymer polyols of the present invention is that, due to the presence of the dispersed polymeric particles with high content of P and N, they will provide flame retardancy properties to the polyurethane derived from its use. Besides, the presence of the dispersed polymeric particles with high content of P and N will provide enhanced oxidative, thermal and UV stability to the polyurethane derived from its use. This enhanced stability is specially useful for polyurethane foams in which scorching and discoloration will be reduced.

In accordance with another aspect of the present disclosure, it is provided a process for producing a modified polymer polyol comprising at least one base polyol and a stable dispersion of polymeric particles in the at least one base polyol, the process comprising the preparation of the polymeric particles in the presence of the at least one base polyol by a polycondensation reaction of a) at least one compound bearing at least one basic-nitrogen atom characterized by the presence in the molecule of at least one hydrogen atom attached to a nitrogen atom, the compound bearing at least one basic-nitrogen atom is selected from those compounds of formula (V) or formula (VI) as defined above; with b) at least one compound bearing a phosphorous atom selected from the group consisting of b1) a compound bearing a phosphine group and b2) a condensation product from at least one compound of formula (I) or at least one compound of formula (II) and at least one compound bearing at least one basic-nitrogen atom, wherein:

i) the at least one compound b1) is selected from the group consisting of at least one hydroxyalkylphosphine of formula (I), at least one hydroxyalkylphosphonium salt of formula (II), at least one hydroxyalkylphosphine oxide of formula (III) and a combination thereof; and ii) the at least one condensation product b2) is at least one condensation product from at least one hydroxyalkylphosphine of formula (I) or at least one hydroxyalkylphosphonium salt of formula (II) and at least one compound bearing at least one basic-nitrogen atom characterized by the presence in the molecule of at least one hydrogen atom attached to nitrogen and is selected from those compounds of formula (V) or formula (VI) as defined above;

wherein the at least one hydroxyalkylphosphine of formula (I), the at least one hydroxyalkylphosphonium salt of formula (II), and the at least one hydroxyalkylphosphine oxide of formula (III) are as defined above.

Suitable compounds bearing at least one basic-nitrogen atom in accordance with the present invention have a functionality greater or equal than 2.

In the context of the present invention, the term compound bearing a basic-nitrogen atom, refers to a compound bearing at least one nitrogen atom attached to at least one hydrogen atom. In the context of the present invention, the term functionality when referring to the compound bearing a basic-nitrogen atom is used herein to indicate the number average functionality (number of hydrogen atoms attached to nitrogen atoms per molecule) of the compound.

In another aspect of the present disclosure, it is provided a process for preparing a polyurethane material wherein at least one polyisocyanate is reacted with an isocyanate-reactive component which comprises at least one modified polymer polyol as described herein, the reaction optionally being carried out in the presence of water and additives such as at least one blowing agent, at least one catalyst and tensioactive products.

Another aspect of the present disclosure provides a polyurethane material obtainable by a process comprising the reaction of at least one polyisocyanate component, with an isocyanate-reactive component which comprises at least one of the herein disclosed polymer modified polyol, in the presence of at least one catalyst and optionally at least one blowing agent.

Additional aspects of the present disclosure refer to an injection molding composition or an article of manufacture comprising the polyurethane material as mentioned above.

DETAILED DESCRIPTION

Base Polyols

With regard to the base polyol used in the preparation of the modified polymer polyosl and/or the polyurethane foam according to the present invention, this base polyol may be of any suitable kind. In accordance with the present disclosure, any base polyol and any kind of polymer polyol may be used as the base polyol.

Representative base polyols useful in the preparation of the modified polymer polyol in accordance with the present disclosure may include any kind of polyol that is known in the art and includes those described herein and any other commercially available polyol. Reperesentative polyols include polyether polyols, polyester polyols, polymer polyols, polyhydroxy-terminated acetal resins, hydroxyl-terminated amines, polyalkylene carbonate-based polyols, acrylic polyols, polyphosphate-based polyols, and polyols comprising a polyether carbonate polyol (POPC). Suitable polymer polyols include PDH polyols, PIPA polyols, SAN polyols, copolymer polyols and polymer polyols comprising a polyether carbonate polyol (POPC) as the base polyol. All types of other polyols like polyols derived from renewable resources (so called natural oil polyols or NOP's) can also be used pure or in mixtures as long as they have the right physico-chemical features.

In the preparation of polyurethanes, polyether and polyester polyols are commonly used, therefore in accordance with the present invention it is preferred that the polyol is wholly or at least predominantly a polyether or a polyester polyol. Where a polyether polyol is used it is preferably wholly or predominantly a ethylene oxide (EO) or propylene oxide (PO) capped polyols, although wholly or predominantly non-EO or non-PO capped polyols may also be used.

In accordance with some examples of the present invention, preferred base polyols are selected from polyether polyols, PDH polyols, PIPA polyols, SAN polyols, and polyols comprising a polyether carbonate polyol (POPC). Some particularly preferred base polyols are selected from polyether carbonate polyols (POPC) and polyether polyols.

In accordance with some examples, suitable base polyols may have an OH functionality of 2 to 10, particularly 2 to 8, being particularly preferred 2 to 4 and 3 to 8.

Suitable base polyols may have a molecular weight (MW) in the range of 150 to 12000; preferably 400 to 12000 and more preferably from 3000 to 12000. Some base polyols according to the invention have a molecular weight (MW) in the range of 400 to 3000; or alternatively in the range of 4500 to 12000.

Viscosity at 25° C. of the base polyols ranges from 50 to 25000 mPa s, preferably from 65 to 9500 and more preferably from 400 to 1300.

The hydroxyl number (iOH) of the base polyols ranges from 5 to 1800 mg KOH/g and preferably from 5 to 600 mg KOH/g; more preferably from 5 to 300 mg KOH/g, alternatively from 20 to 80 mg KOH/g or from 81 to 600 mg KOH/g. In some examples the iOH of the base polyols ranges from 28-280 mg KOH/g; in accordance with additional examples the iOH ranges from 28-56 mg KOH/g and in further examples the iOH ranges from 160-490 mg KOH/g.

Suitable polyether polyols particularly preferred are polyether polyols having a MW in the range of 4500 to 12000; an iOH in the range of 26 to 37 mg KOH/g, with a content of polyethylene oxide terminal blocks of at least 12 wt %. In the context of the present invention, the term "iOH" refers to the hydroxyl number (iOH), defined as the number of milligrams of potassium hydroxide required for the complete hydrolysis of the fully phthalylated derivative prepared from 1 gram of polyol. The hydroxyl number is determined according to ASTM D4274-16.

The term "functionality", when referring to base polyols, is used herein to indicate the number average functionality (number of hydroxyl groups per molecule) of the polyol composition, on the assumption that it is the number average functionality (number of active hydrogen atoms per molecule) of the initiator(s) used in their preparations. Although in practice the real functionality will often be somewhat less because of some terminal unsaturation, for the purpose of characterizing the base polyols, the functionality of the polyol is the functionality of the initiator(s) used for its preparation.

In the context of the present invention, the term "molecular weight" of the polyol is calculated using the following equation $$MW\ polyol = \frac{56{,}1 \times functionality}{Hydroxyl\ number\ (iOH)} \times 1000$$

wherein "functionality" represents the functionality of the polyol, i.e. the average number of hydroxyl groups per molecule of polyol; and hydroxyl number (iOH) is calculated according to ASTM D4274-16.

In the context of the present invention viscosity measurements (in mPa·s) are obtained using a Brookfield DV-III ultra programmable rheometer.

It is well known in the art to use mixed polyols to vary the reactivity of the system or impart desired properties to the resulting polyurethanes. Therefore, in accordance with an embodiment of the present disclosure, mixtures of base polyols, mixtures of polymer polyols or mixtures of base and polymer polyols may also be used.

Phosphines

As used herein, the term hydroxyalkylphosphine refers to an organic compound having at least one hydroxyalkyl group and at least one phosphine group.

In accordance with some examples of the present invention, the at least one compound bearing at least one basic-nitrogen atom characterized by the presence in the molecule of at least one hydrogen atom attached to a nitrogen atom and is selected from those compounds of formula (V) or formula (VI) as defined above is reacted in a polycondensation reaction in the presence of at least one base polyol with the at least one compound b1) selected from the group consisting of at least one hydroxyalkylphosphine of formula (I), at least one hydroxyalkylphosphonium salt of formula (II), at least one hydroxyalkylphosphine oxide of formula (III) and the mixtures thereof to obtain the polymeric particles dispersed into the at least one base polyol.

In some examples of the invention, the at least one compound bearing at least one basic-nitrogen atom characterized by the presence in the molecule of at least one hydrogen atom attached to a nitrogen atom and is selected from those compounds of formula (V) or formula (VI) as defined above is reacted in a polycondensation reaction in the presence of at least one base polyol with at least one hydroxyalkylphosphonium salt of formula (II) which is previously reacted with a base in order to obtain the corresponding hydroxyalkylphosphine of formula (I), thus resulting the polymeric particles dispersed into the at least one base polyol. In this case, the product of the reaction between the at least one hydroxyalkylphosphonium salt of formula (II) and a base, depending on the conditions used, may be a complex mixture of phosphorous compounds (THP, THPO, their corresponding hemiformals and unreacted THPX), water, the corresponding salt and formaldehyde.

In accordance with another examples of the present invention, the at least one condensation product from at least one hydroxyalkylphosphine of formula (I) or at least one hydroxyalkylphosphonium salt of formula (II) and at least one compound bearing at least one basic-nitrogen atom characterized by the presence in the molecule of at least one hydrogen atom attached to a nitrogen atom and is selected from those compounds of formula (V) or formula (VI) as defined above, is reacted with the at least one compound bearing at least one basic-nitrogen atom characterized by the presence in the molecule of at least one hydrogen atom attached to a nitrogen atom, in a polycondensation reaction in the presence of at least one base polyol to obtain the polymeric particles dispersed into the at least one base polyol. Examples of condensation products are known in the art, as those disclosed in U.S. Pat. Nos. 4,145,463, 4,311,855 and 4,078,101.

Thus, in some examples of the present invention, the at least one condensation product is obtained by mixing the requisite quantities of the at least one compound bearing at least one basic-nitrogen atom, characterized by the presence in the molecule of at least one hydrogen atom attached to a nitrogen atom, and the at least one hydroxyalkylphosphine of formula (I) or at least one hydroxyalkylphosphonium salt of formula (II) in water and stirring to cause them to react to form the pre-condensate.

In some examples of the present disclosure, the hydroxyalkylphosphines of formula (I) are those wherein $R_1$, $R_2$ and $R_3$ are each independently selected from H, linear or branched $(C_1$-$C_6)$alkyl, $(C_3$-$C_6)$cycloalkyl, linear or branched $(C_2$-$C_6)$alkenyl, $(C_6$-$C_{12})$aryl, $(C_7$-$C_{12})$arylalkyl, linear or branched hydroxy$(C_1$-$C_4)$alkyl, $(C_7$-$C_{12})$alkylaryl and a radical of formula (IV); and wherein $R_5$ and $R_6$ are each independently selected from H, linear or branched $(C_1$-$C_6)$alkyl, $(C_3$-$C_6)$cycloalkyl, linear or branched $(C_2$-$C_6)$alkenyl, $(C_6$-$C_{12})$aryl, $(C_7$-$C_{12})$arylalkyl, linear or branched hydroxy$(C_1$-$C_4)$alkyl and $(C_7$-$C_{12})$alkylaryl; with the proviso that at least one of $R_1$, $R_2$ and $R_3$ is a radical of formula (IV).

From these examples, particularly the hydroxyalkylphosphines of formula (I) are those wherein $R_1$, $R_2$ and $R_3$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl; and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl; with the proviso that at least one of $R_1$, $R_2$ and $R_3$ is a radical of formula (IV).

In accordance with some particular examples, the hydroxyalkylphosphines of formula (I) are those wherein at least two of $R_1$, $R_2$ and $R_3$ are a radical of formula (IV); and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl.

From these examples, more particularly the hydroxyalkylphosphines of formula (I) are those wherein at least two of $R_1$, $R_2$ and $R_3$ are a radical of formula (IV); and wherein $R_5$ and $R_6$ are H.

In accordance with other particular examples, the hydroxyalkylphosphines of formula (I) are those wherein $R_1$, $R_2$ and $R_3$ are a radical of formula (IV); and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl.

From these examples, more particularly the hydroxyalkylphosphines of formula (I) are those wherein $R_1$, $R_2$ and $R_3$ are a radical of formula (IV); and wherein $R_5$ and $R_6$ are H Examples of hydroxyalkylphosphines of formula (I) above are tris(hydroxymethyl)phosphine, bis-(hydroxymethyl)-methyl phosphine, bis-(hydroxymethyl)-ethyl phosphine, bis(hydroxymethyl) propyl phosphine, bis-(hydroxymethyl)-butyl phosphine, bis(hydroxymethyl) pentyl phosphine, bis(hydroxymethyl) hexyl phosphine, (hydroxymethyl)-dimethyl phosphine, and (hydroxymethyl)-methyl-ethyl phosphine. A particular hydroxyalkylphosphine is tris(hydroxymethyl)phosphine (THP).

In accordance with another examples of the present disclosure, it is possible to use at least one hydroxyalkylphosphonium salt of formula (II) wherein $X^-$ is a monovalent, bivalent or trivalent ligand selected from chloride, bromide, iodide, sulphate, phosphate, hydrogen phosphate, dihydrogen phosphate, hydroxyde, acetate, oxalate and citrate.

In some examples of the present disclosure, the hydroxyalkylphosphonium salts of formula (II) are those wherein $R_1$, $R_2$, $R_3$ and $R_4$ are each independently selected from H, linear or branched $(C_1-C_6)$alkyl, $(C_3-C_6)$cycloalkyl, linear or branched $(C_2-C_6)$alkenyl, $(C_6-C_{12})$aryl, $(C_7-C_{12})$arylalkyl, linear or branched hydroxy$(C_1-C_4)$alkyl, $(C_7-C_{12})$alkylaryl and a radical of formula (IV); and wherein $R_5$ and $R_6$ are each independently selected from H, linear or branched $(C_1-C_6)$alkyl, $(C_3-C_6)$cycloalkyl, linear or branched $(C_2-C_6)$alkenyl, $(C_6-C_{12})$aryl, $(C_7-C_{12})$arylalkyl, linear or branched hydroxy$(C_1-C_4)$alkyl and $(C_7-C_{12})$alkylaryl; with the proviso that at least one of $R_1$, $R_2$, $R_3$ and $R_4$ is a radical of formula (IV); and wherein $X^-$ is a monovalent, bivalent or trivalent ligand selected from chloride, bromide, iodide, sulphate, phosphate, hydrogen phosphate, dihydrogen phosphate, hydroxyde, acetate, oxalate and citrate.

From these examples, particularly the hydroxyalkylphosphonium salts of formula (II) are those wherein $R_1$, $R_2$, $R_3$ and $R_4$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl; and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl; with the proviso that at least one of $R_1$, $R_2$, $R_3$ and $R_4$ s a radical of formula (IV); and wherein $X^-$ is a monovalent, bivalent or trivalent ligand selected from chloride, bromide, iodide, sulphate, phosphate, hydrogen phosphate, dihydrogen phosphate, hydroxyde, acetate, oxalate and citrate.

In accordance with some particular examples, the hydroxyalkylphosphonium salts of formula (II) are those wherein at least two of $R_1$, $R_2$, $R_3$ and $R_4$ are a radical of formula (IV); and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl.

From these examples, particularly the hydroxyalkylphosphonium salts of formula (II) are those wherein at least two of $R_1$, $R_2$, $R_3$ and $R_4$ are a radical of formula (IV); and wherein $R_5$ and $R_6$ are H.

In accordance with other particular examples, the hydroxyalkylphosphonium salts of formula (II) are those wherein $R_1$, $R_2$, $R_3$ and $R_4$ are a radical of formula (IV); and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl.

From these examples, particularly the hydroxyalkylphosphonium salts of formula (II) are those wherein $R_1$, $R_2$, $R_3$ and $R_4$ are a radical of formula (IV); wherein $R_5$ and $R_6$ are H Examples of hydroxyalkylphosphonium salts above are tetrakis(hydroxymethyl) phosphonium chloride (THPC), tetrakis(hydroxymethyl) phosphonium sulphate (THPS), tetrakis(hydroxymethyl) phosphonium phosphate (THPP (3:1)), tetrakis(Hydroxymethyl)phosphonium monohydrogen phosphate (THPP (2:1)), tetrakis(Hydroxymethyl)phosphonium dihydrogen phosphate (THPP (1:1)), tetrakis(hydroxymethyl) phosphonium hydroxide (THPOH), tetrakis (hydroxymethyl) phosphonium oxalate (THPOx) and tetrakis(hydroxymethyl) phosphonium acetate (THPA).

Particular examples of phosphonium salts are tetrakis (hydroxymethyl) phosphonium chloride (THPC) and tetrakis(hydroxymethyl) phosphonium sulphate (THPS)

In some examples of the present invention, it may be possible to use the oxidized form of the previously described hydroxyalkylphosphines; the hydroxyalkylphosphine oxide being obtainable by a process which comprises the reaction of an hydroxyalkylphosphine with an oxidant such as molecular oxygen or hydrogen peroxide, $H_2O_2$.

Therefore, in some examples of the present invention, the hydroxyalkylphosphine oxides of formula (III) are those wherein $R_1$, $R_2$ and $R_3$ are each independently selected from H, linear or branched $(C_1-C_6)$alkyl, $(C_3-C_6)$cycloalkyl, linear or branched $(C_2-C_6)$alkenyl, $(C_6-C_{12})$aryl, $(C_7-C_{12})$arylalkyl, linear or branched hydroxy$(C_1-C_4)$alkyl, $(C_7-C_{12})$alkylaryl and a radical of formula (IV); and wherein $R_5$ and $R_6$ are each independently selected from H, linear or branched $(C_1-C_6)$alkyl, $(C_3-C_6)$cycloalkyl, linear or branched $(C_2-C_6)$alkenyl, $(C_6-C_{12})$aryl, $(C_7-C_{12})$arylalkyl, linear or branched hydroxy$(C_1-C_4)$alkyl and $(C_7-C_{12})$alkylaryl; with the proviso that at least one of $R_1$, $R_2$ and $R_3$ is a radical of formula (IV).

From these examples, particularly the hydroxyalkylphosphine oxides of formula (III) are those wherein $R_1$, $R_2$ and $R_3$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl; and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl; with the proviso that at least one of $R_1$, $R_2$ and $R_3$ is a radical of formula (IV).

In accordance with some particular examples, the hydroxyalkylphosphine oxides of formula (III) are those wherein at least two of $R_1$, $R_2$ and $R_3$ are a radical of formula (IV); and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl.

From these examples, particularly the hydroxyalkylphosphine oxides of formula (II) are those wherein at least two of $R_1$, $R_2$ and $R_3$ are a radical of formula (IV); and wherein $R_5$ and $R_6$ are H.

In accordance with other particular examples, the hydroxyalkylphosphine oxides of formula (III) are those wherein $R_1$, $R_2$ and $R_3$ are a radical of formula (IV); and wherein $R_5$ and $R_6$ are each independently selected from H, methyl, ethyl, propyl, isopropyl, n-butyl, t-butyl, hydroxymethyl, hydroxyethyl, hydroxyisopropyl, hydroxy n-butyl and hydroxy t-butyl.

From these examples, particularly the hydroxyalkylphosphine oxides of formula (III) are those wherein $R_1$, $R_2$ and $R_3$ are a radical of formula (IV); and wherein $R_5$ and $R_6$ are H.

An example of hydroxyalkylphosphine oxide of formula (III) above is tris(hydroxymethyl)phosphine oxide.

In particular examples of the present disclosure, the modified polymer polyol is obtainable by a process comprising the preparation of the polymeric particles in the presence of the at least one base polyol by a polycondensation reaction of at least one compound bearing at least one basic-nitrogen atom as defined above, with a mixture of at least one hydroxyalkylphosphine of formula (I) and at least one hydroxyalkylphosphine oxide of formula (III) as defined above. The mixture of the at least one hydroxyalkylphosphine of formula (I) and at least one hydroxyalkylphosphine oxide of formula (III) being in the molar ratio 1:99 to 99:1; preferably 60:40 to 98:2; more preferably 84:16 to 97:3.

In accordance with an example of the present disclosure, the polycondensation reaction may be carried out in presence of a single hydroxyalkylphosphine, a hydroxyalkylphosphonium salt, a hydroxyalkylphosphine oxide or a mixture of two or more of any of them.

Base

In the event that a hydroxyalkylphosphonium salt is used, it may be necessary to treat it with a base in order to obtain the corresponding hydroxyalkylphosphine. The base may be an organic or an inorganic base; preferably selected from KOH, NaOH, $Ca(OH)_2$, $Mg(OH)_2$, $Ba(OH)_2$, triethylamine ($NEt_3$), tributylamine ($NBu_3$). Alternatively, the hydroxyalkylphosphonium salt may be treated with a basic ion-exchange resin. Both, strong and weak ion exchange resins are suitable for the process. Examples of strong bases would be Amberlite® IRN78 or Amberlist® A26. Examples of weak bases would be Amberlite® IRA 67, Lewatit® MP-62 and Lewatit® VP OC1065.

Therefore, in accordance with some examples of the present disclosure, the hydroxyalkylphosphonium salt may be reacted with a base, thus obtaining the corresponding hydroxyalkylphosphine, the corresponding salt, the corresponding aldehyde and water. In general terms, when a THPX (tetrakis(hydroxymethyl) phosphonium salt) is reacted with a base (e.g. KOH), it is obtained tri(hydroxymethyl)phosphine (THP), formaldehyde, the salt KX and water, as shown in Scheme 1:

Scheme. 1 Reaction of THPX with a base to obtain THP

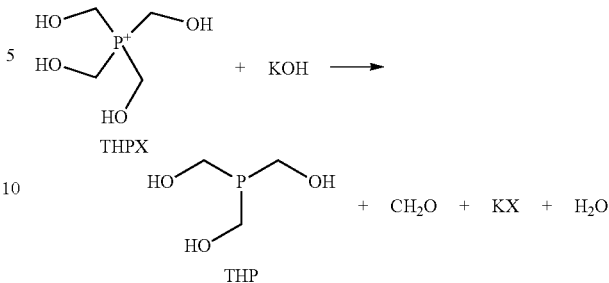

Other phosphorous compounds may appear as reaction products. THPO is usually obtained as co-product together with THP. The quantity of THPO formed depends on the reaction conditions. Basic pH favours the concentration of THPO. Besides, THP and THPO may react with formaldehyde forming the corresponding hemiformals. Mono, di and tri-substituted hemiformals of THP and THPO can be found as reaction products.

In some cases, it is possible to perform the reaction with defect of base and, in that case, non reacted THPX will be present in the reaction media in combination with the obtained products.

The product of the reaction between THPX and a base, depending on the conditions used, may be a complex mixture of phosphorous compounds (THP, THPO, their corresponding hemiformals and unreacted THPX), water, the corresponding salt and formaldehyde. This complex mixture of product is reacted in this present invention with the at least one compound bearing at least one basic-nitrogen atom as defined above.

Compound Bearing at Least One Basic-Nitrogen Atom

In accordance with the present disclosure, the hydroxyalkylphosphine is reacted with at least one compound bearing at least one basic-nitrogen atom characterized by the presence in the molecule of at least one hydrogen atom attached to a nitrogen atom.

Examples of suitable compounds bearing at least one basic-nitrogen atom characterized by the presence in the molecule of at least one hydrogen atom attached to a nitrogen atom are trimethylol melamine, and those compounds of formula (V) or formula (VI);

wherein the compounds of formula (V) are as follows

$$R_7—NH_2 \quad\quad (V)$$

wherein $R_7$ is —H, —$(C_1$-$C_3)$Alkyl, $(C_1$-$C_3)$Alkyl-CO—, $NH_2$—CO—, —$(CH_2)_n$—$NH_2$, —CN, —$NH_2$, —$SO_2NH_2$, cyclohexyl, phenyl, —$SO_2OH$ or —$NHCONHNH_2$; wherein n is an integer from 1-18;

and the compounds of formula (VI) are as follows:

(VI)

wherein R is selected from NH=C< and O=C<; S=C<; and R$_9$ is selected from H, —CN, —NH$_2$, —CONH$_2$, —CONHCONH$_2$, and —CONHCONHCONH$_2$.

In some examples, compounds bearing at least one basic-nitrogen atom are those of formula (V). In accordance with some particular examples, the compounds of formula (V) are those wherein R$_7$ is selected from H, methyl, —CN, CH$_3$—CO—; NH$_2$—CO—.

In some particular examples, compounds bearing at least one basic-nitrogen atom are those of formula (VI) wherein R$_8$ is selected from O=C<; S=C<; and R$_9$ es H.

Particular examples of compounds bearing at least one basic-nitrogen atom characterized by the presence in the molecule of at least one hydrogen atom attached to a nitrogen atom are NH$_3$, primary aliphatic and alicyclic amines, aliphatic and alicyclic primary and secondary polyamines and aromatic primary, secondary and tertiary amines and polyamines, for example, cyanamide, guanidine, 2-cyanoguanidine, methylamine, ethylene diamine, diethylenetriamine, hexamethylendiamine, hydrazine, tertiary octylamine, cyclohexylamine, trimethylol melamine, urea, tiourea, aniline, and polyethyleneimines. NH$_3$, cyanamide, urea, thiourea, diethylentriamine, hydrazine and ethylene diamine are particular preferred examples.

The skilled person in the art may know the method and the suitable media in order to solubilize, if necessary, the compound bearing at least one basic-nitrogen atom.

Reaction Conditions

The polycondensation reaction may be carried out at temperatures from −40 to 200° C. preferably from 0 to 150° C. and most preferably from 20 to 120° C.

The skilled person in the art would know how to adjust the temperature and reaction time in the light of the description and examples herein described in order to complete the polycondensation reaction.

Molar ratios to be used between the phosphorous bearing compound and the compound bearing at least one basic-nitrogen atom depend on the compound bearing at least one basic-nitrogen atom functionality. The skilled person would know how to adjust the molar ratios in the light of the description and examples of the present invention in order to obtain a solid product.

The compound bearing at least one basic nitrogen atom can be added to the reactor as a solid, as a gas or dissolved in a suitable solvent. Aqueous solutions of amines are preferred.

The reaction can be carried out at atmospheric pressure, vacuum or under pressure. Besides, the reaction can be carried out under inert (nitrogen, argon) or oxidant atmosphere (air).

Stirring must be vigorous in order to guarantee the formation of particles and to avoid agglomeration of the products With regard to the specific conditions for carrying out the process of the invention, the skilled person would know how to adjust the parameters of each of the steps indicated above in the light of the description and examples of the present invention.

All the embodiments of the process of the invention contemplate all the combinations providing all the embodiments of the modified polymer polyol of the invention and combinations thereof.

In accordance with some examples of the present disclosure, the polymeric particles result from the polycondensation, in the presence of at least one base polyol, of the at least one hydroxyalkylphosphine of formula (I) with at least one compound bearing at least one basic-nitrogen atom characterized by the presence in the molecule of at least one hydrogen atom attached to a nitrogen atom.

In accordance with another examples of the present disclosure, the polymeric particles result from the polycondensation, in the presence of at least one base polyol, of the at least one hydroxyalkylphosphonium salt of formula (II) with at least one compound bearing at least one basic-nitrogen atom characterized by the presence in the molecule of at least one hydrogen atom attached to a nitrogen atom.

From these examples, particularly, the at least one hydroxyalkylphosphonium salt of formula (II) is previously reacted with a base in order to obtain the corresponding hydroxyalkylphosphine of formula (I), and then it is reacted, in the presence of at least one base polyol, with the at least one compound bearing at least one basic-nitrogen atom characterized by the presence in the molecule of at least one hydrogen atom attached to a nitrogen atom.

In further examples, the polymeric particles result from the polycondensation, in the presence of at least one base polyol, of the at least one hydroxyalkylphosphine oxide of formula (III) with at least one compound bearing at least one basic-nitrogen atom characterized by the presence in the molecule of at least one hydrogen atom attached to a nitrogen atom.

In other examples, the polymeric particles result from the polycondensation, in the presence of at least one base polyol, of a mixture two or more of a hydroxyalkylphosphine of formula (I), a hydroxyalkylphosphonium salt (II) and a hydroxyalkylphosphine oxide (III) with at least one compound bearing at least one basic-nitrogen atom characterized by the presence in the molecule of at least one hydrogen atom attached to a nitrogen atom.

In accordance with another examples of the present invention, the polymeric particles result from the polycondensation, in the presence of at least one base polyol, of the at least one condensation product from a hydroxyalkylphosphine of formula (I) or a hydroxyalkylphosphonium salt of formula (II) and at least one compound bearing at least one basic-nitrogen atom characterized by the presence in the molecule of at least one hydrogen atom attached to a nitrogen atom and is selected from those compounds of formula (V) or formula (VI) as defined above; with at least one compound bearing at least one basic-nitrogen atom characterized by the presence in the molecule of at least one hydrogen atom attached to a nitrogen atom and is selected from those compounds of formula (V) or formula (VI) as defined above.

In accordance with another examples, the process comprises mixing simultaneously or sequentially in any order a) the at least one compound bearing at least one basic-nitrogen atom characterized by the presence in the molecule of at least one hydrogen atom attached to a nitrogen atom and is selected from those compounds of formula (V) or formula (VI) as defined above; with at least one compound bearing a phosphorous atom selected from the group consisting of b1) which is selected from the group consisting of at least one hydroxyalkylphosphine of formula (I), at least one hydroxyalkylphosphonium salt of formula (II), at least one hydroxyalkylphosphine oxide of formula (III) and a combination thereof; and the at least one base polyol.

In some particular examples, it may be necessary to remove the volatile compounds present in the media.

In accordance with some particular examples, the process of producing the modified polymer polyol of the present invention comprising a stable dispersion of polymeric particles in the at least one base polyol, comprises the following steps:

a) adding at least one compound bearing a phosphorous atom selected from the group consisting of b1) which is selected from the group consisting of at least one hydroxyalkylphosphine of formula (I), at least one hydroxyalkylphosphonium salt of formula (II), at least one hydroxyalkylphosphine oxide of formula (III) and a combination thereof, to at least one base polyol, in the presence of water; and b) adding at least one compound bearing at least one basic-nitrogen atom characterized by the presence in the molecule of at least one hydrogen atom attached to a nitrogen atom and is selected from those compounds of formula (V) or formula (VI) as defined above to the resulting mixture in a) to obtain a modified polymer polyol comprising a stable dispersion of polymeric particles;

c) optionally removing the volatile compounds, such as water or the corresponding aldehyde, present in the media (e.g. by means of the use of temperature and vacuum) to obtain a modified polymer polyol comprising a stable polymeric particle dispersion in the at least one base polyol.

In accordance with particular examples, as for the case when tiourea is used, the process of producing the modified polymer polyol of the present invention comprising an stable dispersion of polymeric particles in the at least one base polyol, comprises the following steps:

a) mixing the tiourea and the at least one compound bearing a phosphorous atom selected from the group consisting of b1) which is selected from the group consisting of at least one hydroxyalkylphosphine of formula (I), at least one hydroxyalkylphosphonium salt of formula (II), at least one hydroxyalkylphosphine oxide of formula (III) and a combination thereof;

b) adding the resulting mixture in a) to the at least one base polyol; and c) optionally removing the volatile compounds, such as water or the corresponding aldehyde, present in the media (e.g. by means of the use of temperature and vacuum) to obtain a modified polymer polyol comprising a polymeric particle dispersion.

In a particular realization of this embodiment, the polycondensation reaction may be preceded by the reaction of a hydroxyalkylphosphonium salt of formula (II) with a base to obtain the corresponding hydroxyalkylphosphine of formula (I) which in a second step is reacted with the at least one compound bearing at least one basic-nitrogen atom characterized by the presence in the molecule of at least one hydrogen atom attached to a nitrogen atom and is selected from those compounds of formula (V) or formula (VI) as defined above.

A general two-step preparation process when a hydroxyalkylphosphonium salt of formula (II) is previously reacted with a base to obtain the corresponding hydroxyalkylphosphine of formula (I) may be as follows:

An aqueous or alcoholic solution of the base (MOH) is added to the hydroxyalkylphosphonium salt solution (preferably an aqueous solution). Once the hydroxyalkylphosphonium and the base are mixed the corresponding MX salt is formed. Depending on the solubility of the salt, a precipitate may be formed, in that case the salt is filtered out. The obtained solution may be further diluted with water, and then it is added to the at least one base polyol and the mixture is stirred. Finally, the at least one compound bearing at least one basic-nitrogen atom, characterized by the presence in the molecule of at least one hydrogen atom attached to a nitrogen atoms, is added and the reaction is maintained under stirring. The volatile compounds present in the product may be removed from the product by any conventional method, such as vacuum distillation. In this distillation step the temperature may be raised in order to favor the removal of volatile compounds. Resulting product is a modified polymer polyol comprising a polyol and polymeric particles dispersed in the base polyol.

If required, the resulting modified polymer polyol may be used as is, or may be filtered to remove any large particles that may have been created.

The modified polymer polyol of the present invention, is a polyol which has finely dispersed particles of a polymer with high content of nitrogen and phosphorous. Accordingly, the polymeric particles dispersed in the at least one polyol have a phosphorous content from 0.1 to 50 wt %; preferably from 5 to 40 wt % and most preferably from 13 to 35 wt %. The polymeric particles dispersed in the at least one polyol have a nitrogen content from 0.1 to 40 wt %; preferably from 5 to 40 wt % and most preferably from 7 to 30 wt %. In conjunction the sum of the content of nitrogen and phosphorous is from 0.1 to 90 wt %; preferably from 10 to 70 wt % and most preferably from 20 to 60 wt %.

In accordance with some examples of the present disclosure, the polymeric particles result from the one-pot polycondensation reaction of the at least one hydroxyalkylphosphonium salt of formula (II), at least one hydroxyalkylphosphine oxide of formula (II) or a combination thereof with the at least one compound bearing a at least one basic-nitrogen atom, characterized by the presence in the molecule of at least one hydrogen atom attached to a nitrogen atom and is selected from those compounds of formula (V) or formula (VI) as defined above, in the presence of the at least one base polyol and water.

In general terms, the one-pot process of producing the modified polymer polyol of this embodiment of the present disclosure comprising polymeric particles dispersed in the base polyol, comprises the following steps:

a) adding the at least one compound bearing a phosphorous atom selected from the group consisting of b1) which is selected from the group consisting of at least one hydroxyalkylphosphine of formula (I), at least one hydroxyalkylphosphonium salt of formula (II), at least one hydroxyalkylphosphine oxide of formula (III) and a combination thereof to at least one base polyol, in the presence of water; and b) adding at least one compound bearing at least one basic-nitrogen atom, characterized by the presence in the molecule of at least one hydrogen atom attached to a nitrogen atom and is selected from those compounds of formula (V) or formula (VI) as defined above, to the resulting mixture in a) to obtain a modified polymer polyol comprising a polymeric particle dispersion.

Optionally, depending on the reactivity of the compound bearing at least one basic-nitrogen atom, characterized by the presence in the molecule of at least one hydrogen atom attached to a nitrogen atom, both the at least one hydroxyalkylphosphonium salt and the at least one compound bearing at least one basic-nitrogen atom, characterized by the presence in the molecule of at least one hydrogen atom attached to a nitrogen atom and is selected from those compounds of formula (V) or formula (VI) as defined above, may be added together dissolved in a suitable solvent. In accordance with some examples of this embodiment, the process may further comprise c) removing the volatile compounds such as water or the corresponding aldehyde present in the media after the reaction.

In some examples, the resulting product of this one-pot polycondensation reaction is a polyol which has finely dispersed particles of a polymer with high content of nitrogen and phosphorous.

In accordance with this embodiment of the present disclosure, the polymeric particles dispersed in the at least one polyol have a phosphorous content from 0.1 to 50 wt %; preferably from 5 to 40 wt % and most preferably from 13 to 35 wt %. The polymeric particles dispersed in the at least one polyol have a nitrogen content from 0.1 to 40 wt %; preferably from 5 to 40 wt % and most preferably from 7 to 30 wt %. In conjunction sum of the content of nitrogen and phosphorous is from 0.1 to 90 wt %; preferably from 10 to 70 wt % and most preferably from 20 to 60 wt %.

A general description of the one-pot method starting from a hydroxyalkylphosphonium salt may be as follows:

The hydroxyalkylphosphonium salt (preferably in aqueous solution) is added to the at least one base polyol and the mixture is stirred. Then, the at least one compound bearing at least one basic-nitrogen atom, characterized by the presence in the molecule of at least one hydrogen atom attached to a nitrogen atom and is selected from those compounds of formula (V) or formula (VI) as defined above is added, and the reaction is maintained under stirring. The volatile compounds present in the product may be removed from the product by any conventional method, such as vacuum distillation. In this distillation step the temperature may be raised in order to favor the removal of volatile compounds. The resulting product is a modified polymer polyol comprising a polyol and a polymeric particle dispersion.

In accordance with a particular embodiment of the present disclosure, the polymeric particles dispersed in the at least one base polyol, may be further oxidized using suitable oxidizing agents such as manganate, permanganate, peroxides and molecular oxygen; preferably the oxidizing agent is molecular oxygen and/or hydrogen peroxide.

The oxidation step is performed by introducing at least one oxidizing agent in the media once the polycondensation reaction has occurred. If hydrogen peroxide is used as oxidating agent, this one may be added in aqueous solution to the modified polymer polyol containing the stable dispersion of polymeric particles in the base polyol. If molecular oxygen is used as the oxidant, the oxidation may be done bubbling air into the system once the polymeric particles are formed.

The polycondensation product resulting from the polycondensation of the at least one compound bearing a phosphorous atom selected from the group consisting of b1) which is selected from the group consisting of at least one hydroxyalkylphosphine of formula (I), at least one hydroxyalkylphosphonium salt of formula (II), at least one hydroxyalkylphosphine oxide of formula (III) and a combination thereof with at least one compound bearing at least one basic-nitrogen atom, characterized by the presence in the molecule of at least one hydrogen atom attached to a nitrogen atom and is selected from those compounds of formula (V) or formula (VI) as defined above, in the presence of the at least one base polyol, take a form of a stable polymeric particle dispersion in the at least one polyol, that is a dispersion which does not settle out, or at least will remain in dispersion during mixing with other foam forming ingredients.

The polyol composition according to the present invention comprises polymeric particles of which at least 90% by volume has a particle size of 10 µm or less (particle size is measured using a mastersizer 3000, from Malvern Instruments, equipped with a hydro SM dispersion accessory, using ethanol as eluent); preferably less than 1 µm; more preferably from 10-1000 nm, being particularly preferred from 10-200 nm. In some examples, polymeric particles of particle size from 10-200 nm agglomerate to form aggregated particles in the range of 0.21 to 500 µm, preferably from 0.21 to 100 µm, more preferably from 0.21 to 50 µm and being particularly preferred from 0.21 to 10 µm.

The polymeric modified polyols of the present disclosure are useful for the preparation of polyurethane materials such as polyurethane foams, adhesives, elastomers, sealants and coatings.

When the modified polymer polyol is obtainable by the polycondensation reaction of at least one hydroxyalkylphosphonium salt of formula (II) with at least one amine or at least one compound bearing a basic-nitrogen atom, in the presence of at least one polyol, it may show a high acidity, which may be necessary to neutralize before its use in the preparation of polyurethane foams.

If needed, the neutralization step is done by contacting the modified polyol with an aqueous solution of a basic compound (MOH). The neutralization reaction is followed by the controlled evaporation of water that leaves crystals of the corresponding salt. These crystals are significantly bigger than the polymer particles, and can be removed from the media by filtration.

Alternatively, neutralization agents as ion exchange resins or trialkyl amines can be used. The neutralization can be done both at room or high temperature.

Polyurethane

In the preparation of polyurethane foams, polyisocyanates, water and additives conventionally used in the manufacture of polyurethane foams may be used in combination with the modified polymer polyols of the present disclosure, in amounts and under reaction conditions which will vary depending on the type and desired properties of the polyurethane foam to be prepared. The skilled person knows different types of reactants, catalysts and conditions necessary to prepare polyurethane foams.

Thus, polyisocyanates which may be used in the preparation of the polyurethane foams in combination with the modified polymer polyols of the present disclosure are well known in the art. Examples of suitable isocyanates include the 4,4'-, 2,4' and 2,2-isomers of diphenylmethane diisocyanate (MDI), blends thereof and polymeric and monomeric MDI blends, toluene-2,4- and 2,6-diisocyanates (TDI), TDI/MDI blends may also be used.

The polyisocyanate may be used at an isocyanate index of from 60 to 140, preferably from 80 to 120 and most preferably from 90 to 110. The isocyanate index is defined as the ratio of isocyanate-groups over isocyanate-reactive hydrogen atoms present in a polyurethane formulation. Thus, the isocyanate index expresses the percentage of isocyanate actually used in a formulation with respect to the amount of isocyanate theoretically required for reacting with the amount of isocyanate-reactive hydrogen used in a formulation.

The blowing agent may be selected from any blowing agent commonly known in the art. The main blowing agent is the carbon dioxide generated by the decarboxylation of the carbamic acid generated by the reaction of water with the isocyanate. Alternative blowing agents (ABA) such as liquid carbon dioxide, methylene chloride, HCFC, pentane, etc. may be used according to legislation and targeted foam properties.

The blowing agent concentration in a expandable polymer composition is preferably comprised from 0% w/w to 120% w/w relative to total expandable polymeric mixture weight; more preferably from 0% w/w to 40% w/w; yet more preferably from 0% w/w to 10% w/w.

Any known catalyst may be used, including aminic compounds, such as triethylenediamine, N-methylmorpholine, N,N-dimethylcyclohexylamine, pentamethyldiethylenetriamine, tetramethylethylenediamine, bis(dimethylaminoethyl)ether, 1-methyl-4-dimethylaminoethyl-piperazine, 3-methoxy-N-dimethylpropylamine, N-ethylmorpholine, dimethylethanolamine, N-cocomorpholine, N,N-dimethyl-N',N'-dimethyl isopropylpropylenediamine, N,N-diethyl-3-diethylamino-propylamine and dimethylbenzylamine. Metal catalyst based on tin, zinc, bismuth and other metals may be used in the foam formulations such as for example tin octoate, tin dibutyldilaurate, zinc octoate, and other similar compounds.

The amount of catalysts may vary from 0 to 4 wt % in the formulation; preferably in the range 0 to 2 wt %, most preferably from 0 to 1 wt %. Another option is the use of autocatalytic polyols, based on tertiary amine initiators, replacing the amine catalysts, hence reducing volatile organic compounds in the foam.

Among the additional additives which may be employed in preparing polyurethane polymers are fillers (for example, talc, silica, titania, magnesia, calcium carbonate, carbon black, graphite, magnesium silicate or clays such as kaolinite and montmorillonite); flame retardants (for example, halogenated flame retardants, such as hexabromocyclododecane and brominated polymers, or phosphorous flame retardants such as triphenylphosphate, dimethyl methylphosphonate, red phosphorous or aluminium diethyl phosphinate); acid scavengers (for example, calcium stearate, magnesium oxide, zinc oxide, tetrasodium pyrophosphate or hydrotalcite); antioxidants (for example, sterically hindered phenols, phosphites and mixtures thereof); and pigments and blowing agent stabilizers. A silicone surfactant may be necessary to stabilize the foam formulation, those products are available from the main actors of the market such as EVONIK, MOMENTIVE, AIR PRODUCTS, STRUKSILON, etc.

The polyurethane foam may be prepared by any known method. Thus, for example, the polyurethane foam may be formed by the so-called prepolymer method, in which a stoichiometric excess of the polyisocyanate is first reacted with the high equivalent weight polyol to form a prepolymer, which is in a second step reacted with a chain extender and/or water to form the desired foam. Frothing methods may also be suitable. The so-called one-shot methods may also be used. In such one-shot methods, the polyisocyanate and all isocyanate-reactive components are simultaneously brought together and caused to react. Three widely used one-shot methods which are suitable for use herein include slabstock foam processes, high resiliency slabstock foam processes, molded foam methods and box foam methods.

Slabstock foam may be prepared by mixing the foam ingredients and dispensing them into a trough or other pour plate where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun.

High resilience slabstock (HR slabstock) foam may be made in methods similar to those used to make conventional slabstock foam but using higher equivalent weight polyols.

Molded foam can be made according to the invention by transferring the reactants (polyol composition including copolyester, polyisocyanate, blowing agent, and surfactant) to a closed mold, made of steel, aluminum or epoxy resin, where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam.

Box foam method consists in discontinuous foam production performed either with a simple mixer used to mix the foam components previously weighted with a scale or machines able to dose and mix the quantity of each product needed to prepare a foam block, in both cases the liquid resulting from the mixture of all components is being poured into a mould which defined the block size.

In accordance with the present disclosure, any type of flexible (conventional, high resilience, viscoelastic foams), semi-flexible or rigid polyurethane foams may be prepared using the modified polymer polyols of the present disclosure provided that the polyurethanes foam forming reactants, catalysts and additives are selected and processed in an appropriate known manner.

Polyurethane foams prepared from the modified polymer polyols of the present disclosure show a density from 4 to 120 kg/m$^3$, preferably 15 to 80 kg/m$^3$, most preferably 20 to 60 kg/m$^3$.

Using the modified polymer polyols of the present disclosure in the preparation of polyurethane foams results in the improvement of the fire retardant and resistance to thermal ageing properties of the foams thus obtained. Therefore, depending on the required burning test, the polyurethane foams obtained might not require any other fire retardant additive, although any additional known flame retardants additives may be used in the preparation of the polyurethane foams in combination with the modified polymer polyols of the present disclosure.

Using the modified polymer polyols of the present disclosure in the preparation of polyurethane foams results in foams which retain fire retardant properties longer than foams prepared with liquid fire retardant additives, avoiding the known migration problems thereof.

The modified polymer polyols according to the present disclosure show relative low viscosity, and a high phosphorous and nitrogen content. Thus, the modified polymer polyols are particularly useful in the preparation of polyurethane foams with improved fire retardant properties and reduced solids content.

Furthermore, the use of modified polymer polyols of the present disclosure in rigid foams reduces the values of thermal conductivity of the foams improving the insulation capacity of the foam.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular and preferred embodiments described herein.

As used herein, the following terms shall have the following meanings:

As used herein, the hydroxyl number (iOH) was determined according to ASTM D4274-16 and is defined as the number of milligrams of potassium hydroxide required for the complete hydrolysis of the fully phthalylated derivative prepared from 1 gram of polyol.

The term "functionality" is used herein to indicate the number average functionality (number of hydroxyl groups per molecule) of the polyol composition, on the assumption that it is the number average functionality (number of active hydrogen atoms per molecule) of the initiator(s) used in their preparations. Although in practice the real functionality will often be somewhat less because of some terminal unsaturation, for the purpose of characterizing the base polyols, the functionality of the polyol is the functionality of the initiator(s) used for its preparation.

The acid number is defined as the number of milligrams of potassium hydroxide required for the complete neutralization of the sample. The determination of the acid number is done by KOH titration of a polyol sample dissolved in a mixture of isopropyl alcohol and water (62.5/37.5 wt/wt).

All viscosity measurements (in mPa·s) are obtained using a Brookfield DV-Ill ultra programmable rheometer.

The oxidation temperature was calculated by DSC measurements following the ASTM E2009-08(2014)e1.

The nitrogen was determined following the ASTM D5291-16 standard.

The phosphorous content was determined following an internal procedure. The samples were digested with nitric acid and hydrogen peroxide at 220° C. and 45 bar using an Ultrawave Microwave Acid Digestion System. The resulting sample was analyzed using SPECTRO ARCOS ICP-OES analyzer.

The LOI (Limiting Oxygen Index) values were tested following ASTM D2863-97 standard test method.

Cone calorimetric tests were done according to the ISO 5660-1 standard. Specimens with sheet dimensions of 100×100×4 mm were irradiated at a heat flux of 25 kW/m$^2$.

The Butler Chimney Tests were done following the ASTM D3014-11 standard test method.

Thermal conductivity of foam samples was measured following the ASTM C518-17 standard test method.

Density of foams was measured following the UNE EN ISO 845 standard test method.

In the context of the present disclosure, the term "percentage (%) by weight" refers to the percentage of each ingredient of the combination or composition in relation to the total weight.

All the embodiments of the process of the present disclosure contemplate all the combinations providing all the embodiments of the extract of the invention and combinations thereof.

The modified polymer polyol "obtainable by" the process of the invention is used here to define the modified polymer polyol by the process for obtaining it and refers to the product obtainable by the preparation as defined herein. For the purposes of the invention the expressions "obtainable", "obtained" and equivalent expressions are used interchangeably, and in any case, the expression "obtainable" encompasses the expression "obtained".

For the purposes of the invention, any ranges given include both the lower and the upper end-points of the range. Ranges given, such as temperatures, times, sizes, and the like, should be considered approximate, unless specifically stated.

The following examples are provided to illustrate the embodiments of the invention, but are not intended to limit the scope thereof. All parts and percentages are by weight unless otherwise indicated.

Examples

The following examples are provided to illustrate the embodiments of the invention, but are not intended to limit the scope thereof. All parts and percentages are by weight unless otherwise indicated.

The following materials were used:

Polyol A—A glycerol (functionality 3) initiated polyether polyol (PO/EO) with a hydroxyl number of 28 mgKOH/g, a content of polyethylene oxide terminal blocks of 14 wt % and a viscosity at 25° C. of 1100 mPa s Polyol B—A glycerol/sorbitol (functionality 4,5) initiated polyether polyol (PO/EO) with a hydroxyl number of 31 mgKOH/g and a content of polyethylene oxide terminal blocks of 16 wt % and a viscosity at 25° C. of 1250 mPa s.

Polyol C—A glycerol (functionality 3) initiated polyether polyol (PO/EO) with a hydroxyl number of 35 mgKOH/g and a content of polyethylene oxide terminal blocks of 18 wt % and a viscosity at 25° C. of 870 mPa s.

Polyol D—A glycerol (functionality 3) initiated polyether polyol (PO/EO) with a hydroxyl number of 48 mgKOH/g, a content of polyethylene units, randomly distributed along the central backbone of the polyol, of 12 wt % and a viscosity at 25° C. of 560 mPa s.

Polyol E—A polymeric polyether polyol based on styrene/acrylonitrile compolymer (SAN) dispersed in Polyol C with a solids content of 25 wt % and a hydroxyl number of 26 mgKOH/g and a viscosity at 25° C. of 2600 mPa s.

Polyol F—A glycerol (functionality 3) initiated polyether carbonate polyol (PO/$CO_2$) with a hydroxyl number of 54 mgKOH/g, a content of $CO_2$ units, randomly distributed along the central backbone of the polyol, of 15 wt % and a viscosity at 25° C. of 7800 mPa s.

Polyol G—A glycerol/sucrose (functionality 4,5) initiated polyether polyol (PO) with a molecular weight of 630 g/mol with an hydroxyl number of 410 mgKOH/g and a viscosity of 5250 mPa s.

$NH_3$—Aqueous ammonia solution of different concentrations. Available from Sigma Aldrich.

THPS—Tetrakis(hydroxymethyl)phosphonium sulphate salt (70-75 wt % in water). Available from Sigma Aldrich.

THPC—Tetrakis(hydroxymethyl)phosphonium chloride salt (80 wt % in water). Available from Sigma Aldrich.

KOH—Potassium hydroxide (≥85 wt %). Available from Sigma Aldrich.

Ca(OH)$_2$—Calcium hydroxide (96 wt %). Available from Sigma Aldrich.

Ba(OH)$_2$—Barium hydroxide hydrate (98 wt %). Available from Sigma Aldrich.

DETA—Diethylenetriamine (99 wt %). Available from Sigma Aldrich.

EDA—Ethylenediamine (>99 wt %). Available from Sigma Aldrich.
DEOA—N,N-Diethanolamine (≥99.0 wt %). Available from Sigma Aldrich.
CA—Aqueous solution of Cyanamide (50 wt % in water). Available from Sigma Aldrich.
MA—Methylamine (40 wt % in water). Available from Sigma Aldrich.
TU—Thiourea (? 99.0 wt %). Available from Sigma Aldrich.
UR—Urea (98 wt %). Available from Sigma Aldrich.
HYD—Hydrazine (35 wt %). Available from Sigma aldrich.
$H_2O_2$—Hydrogen peroxide solution 30 wt % (w/w) in water. Available from sigma Aldrich.
Tegoamin® 33—A solution of 33 wt % triethylene diamine in dipropyleneglycol available from Evonik Industries.
Ortegol®-204—Crosslinking agent with a delayed reaction, specially designed for the production of HR slabstock foams available from Evonik Industries.
Kosmos®-29—Tin Octoate. available from Evonik Industries.
Tegoamin® BDE—Solution of 70 wt % Bis(2-dimethylaminoethyl)ether in dipropyleneglycol available from Evonik Industries.
Tegostab® B 8681—Silicone surfactant for polyurethane foam available from Evonik industries.
Jeffcat® DMCHA—N,N-Dimethylcyclohexylamine available from Huntsman.
Tegostab® B 8404—Silicone surfactant for polyurethane foam available from Evonik industries.
Solkane® 365/227—Liquid hydrofluorocarbon blowing agent
Suprasec® 5025—Standard polymeric MDI (Methylene diphenyl diisocyanate) grade available from Hutnsman.
Amberlite® IRN78 Resin—Anion exchange resin in the hydroxide form available from The Dow Chemical Company.
Amberlist® A26 OH—Anionic, macroreticular polymeric resin based on crosslinked styrene divinylbenzene copolymer containing quaternary ammonium groups. Available from The Dow Chemical Company.
TDI-80—Toluene diisocyanate (80/20).

A. Examples of Modified Polymer Polyol Obtained Following the General Two-Step Process.

In a glass reactor equipped with mechanical stirring, the base (MOH) was dissolved into an amount of water or alcohol. The basic solution was added slowly and under stirring over the hydroxyalkylphosphonium salt (THPX), resulting in the precipitation of the corresponding MX salt. After complete precipitation, the MX salt was filtered out, and the filtered solution was further diluted with water. The resulting solution was added to the polyol, previously placed in a glass reactor, under vigorous stirring. The stirring was maintained for 10 minutes and then the amine or the compound bearing a basic-nitrogen atom was added. The reaction was kept under stirring for 1 hour and then the volatiles were distilled off under reduced pressure following different steps:

1.—The pressure was reduced, at room temperature, below 10 mbar and kept at these conditions for 30 min.
2.—Temperature was raised to 60° C., maintaining the pressure below 10 mbar, and is kept at these conditions for 15 min.
3.—Temperature was raised to 80° C., maintaining the pressure below 10 mbar, and is kept at these conditions for 15 min.
4.—Temperature was raised to 100° C., maintaining the pressure below 10 mbar, and is kept at these conditions for 15 min.
5.—Temperature was raised to 120° C., maintaining the pressure below 10 mbar, and was kept at these conditions for 30 min.
6.—Finally the pressure was increased to atmospheric pressure and the product was collected.

Exceptionally, when the compound bearing at least one basic-nitrogen atom is a solid, as for the case of urea and tiourea, it was dissolved using the amount of water indicated in the corresponding table and mixed directly with the alcoholic solution obtained after the MX salt was filtered. The resulting solution containing both the compound bearing at least one basic-nitrogen atom and the phosphorous containing compound, was added to the base polyol, and then the reaction was continued as described above.

The resulting product is a polyol which has finely dispersed particles of a polymer with high content of nitrogen and phosphorous.

The quantities of reactants used in each example are summarized in Table 1.

TABLE 1

| Example | Stirring speed (rpm) | Polyol Type | g | THPX Type | g | Base Type | g | Amine Type | g | EtOH ml | Water ml |
|---|---|---|---|---|---|---|---|---|---|---|---|
| 1 | 1000 | Polyol A | 100 | THPS | 10 | KOH | 2.4 | $NH_3$ (30-33%) | 2.4 | 15 | 0 |
| 2 | 1000 | Polyol A | 100 | THPS | 10 | KOH | 2.4 | $NH_3$ (30-33%) | 2.4 | 15 | 10 |
| 3 | 1000 | Polyol A | 100 | THPS | 10 | KOH | 2.4 | $NH_3$ (30-33%) | 2.4 | 15 | 20 |
| 4 | 600 | Polyol A | 100 | THPS | 10 | KOH | 2.4 | $NH_3$ (30-33%) | 2.4 | 15 | 10 |
| 5 | 300 | Polyol A | 100 | THPS | 10 | KOH | 2.4 | $NH_3$ (30-33%) | 2.4 | 15 | 10 |
| 6 | 1000 | Polyol A | 500 | THPS | 100 | KOH | 24.0 | $NH_3$ (30-33%) | 24.4 | 150 | 100 |
| 7 | 1000 | Polyol D/Polyol A (50/50) | 500 | THPS | 100 | KOH | 24.0 | $NH_3$ (30-33%) | 24.4 | 150 | 100 |
| 8 | 1000 | Polyol D/Polyol A (80/20) | 100 | THPS | 10 | KOH | 2.4 | $NH_3$ (30-33%) | 2.4 | 15 | 10 |
| 9 | 1000 | Polyol A | 100 | THPS | 20 | KOH | 4.8 | $NH_3$ (20%) | 2.6 | 30 | 20 |
| 10 | 1000 | Polyol A | 100 | THPS | 20 | KOH | 4.8 | $NH_3$ (20%) | 3.8 | 30 | 20 |
| 11 | 1000 | Polyol A | 100 | THPS | 20 | KOH | 4.8 | $NH_3$ (20%) | 10.2 | 30 | 20 |
| 12 | 1000 | Polyol A | 100 | THPS | 20 | KOH | 4.8 | $NH_3$ (20%) | 15.3 | 30 | 20 |

TABLE 1-continued

| Example | Stirring speed (rpm) | Polyol Type | g | THPX Type | g | Base Type | g | Amine Type | g | EtOH ml | Water ml |
|---|---|---|---|---|---|---|---|---|---|---|---|
| 13 | 1000 | Polyol A | 100 | THPS | 20 | KOH | 4.8 | $NH_3$ (20%) | 1.3 | 30 | 20 |
| 14 | 1000 | Polyol A | 100 | THPS | 10 | KOH | 2.4 | DETA | 2.6 | 15 | 10 |
| 15 | 1000 | Polyol A | 100 | THPS | 10 | KOH | 2.4 | EDA | 2.4 | 15 | 10 |
| 16 | 1000 | Polyol A | 100 | THPS | 10 | KOH | 2.4 | EDA | 4.9 | 15 | 10 |
| 17 | 1200 | Polyol C | 600 | THPS | 60 | KOH | 14.1 | $NH_3$ (30-33%) | 15.9 | 60 | 0 |
| 18 | 1200 | Polyol C | 600 | THPS | 60 | KOH | 14.1 | $NH_3$ (30-33%) | 15.9 | 60 | 60 |
| 19 | 1200 | Polyol A | 1000 | THPS | 150 | KOH | 35.3 | $NH_3$ (30-33%) | 39.7 | 150 | 100 |
| 20 | 1200 | Polyol B | 800 | THPS | 120 | KOH | 28.2 | $NH_3$ (30-33%) | 31.7 | 120 | 80 |
| 21 | 1000 | Polyol F | 100 | THPS | 10 | KOH | 2.4 | $NH_3$ (28-30%) | 3.9 | 15 | 10 |
| 22 | 1000 | Polyol A | 100 | THPS | 20 | KOH | 4.8 | HYD | 6.86 | 20 | 20 |
| 23 | 1000 | Polyol A | 100 | THPS | 10 | KOH | 2.4 | MA | 3.8 | 15 | 10 |
| 24 | 1000 | Polyol A | 100 | THPS | 10 | KOH | 2.4 | TU | 3.1 | 15 | 10 |
| 25 | 1000 | Polyol A | 500 | THPS | 100 | KOH | 24.1 | CA | 46.1 | 100 | 100 |

In some examples KOH was replaced by other basic compounds. In these cases, the same procedure was employed with the difference that the basic compound was dissolved or dispersed in water instead of using ethanol. Some examples are shown in Table 2:

TABLE 2

| Example | rpm | Polyol Type | g | THPX Type | g | Base Type | g | Amine Type | g | EtOH ml | Water ml |
|---|---|---|---|---|---|---|---|---|---|---|---|
| 26 | 1000 | Polyol A | 100 | THPS | 10 | $Ca(OH)_2$ | 1.4 | $NH_3$ (30-33%) | 2.4 | 0 | 20 |
| 27 | 1000 | Polyol A | 100 | THPS | 10 | $Ba(OH)_2\ H_2O$ | 3.5 | $NH_3$ (30-33%) | 2.4 | 0 | 20 |

Additionally, in some examples anionic exchange resins were used as the basic compound. In these cases the resin was placed in a fixed-bed column and the water solution of THPC or THPS was passed through it. The resulting solution was added to the base polyol and the process continued with the addition of the compound containing a basic-nitrogen atom as described before. Exceptionally when urea was used, since it is a solid compound, it was dissolved in the water solution obtained after passing the THPX solution through the fixed-bed column and the procedure continued as described above. Some examples are shown in Table 3.

TABLE 3

| Example | rpm | Polyol Type | g | THPX Type | g | Base Type | g | Amine Type | g | EtOH ml | Water ml |
|---|---|---|---|---|---|---|---|---|---|---|---|
| 28 | 1000 | Polyol A | 100 | THPS | 10 | Amberlite ® IRN78 | 24.4 | $NH_3$ (28-30%) | 2.6 | 0 | 10 |
| 29 | 1000 | Polyol A | 100 | THPS | 10 | Amberlist A26 | 31.8 | $NH_3$ (28-30%) | 2.6 | 0 | 10 |
| 30 | 1000 | Polyol A | 100 | THPC | 10 | Amberlite ® IRN78 | 28.0 | $NH_3$ (28-30%) | 3.0 | 0 | 10 |
| 31 | 1000 | Polyol A | 100 | THPC | 10 | Amberlist A26 | 36.5 | $NH_3$ (28-30%) | 3.0 | 0 | 10 |
| 32 | 1000 | Polyol A | 100 | THPC | 10 | Amberlist A26 | 36.5 | Urea | 3.8 | 0 | 20 |
| 33 | 1000 | Polyol A | 100 | THPS | 10 | Amberlist A26 | 36.5 | CA | 4.7 | 0 | 10 |
| 34 | 1000 | Polyol A | 100 | THPC | 10 | Amberlist A26 | 36.5 | MA | 5.0 | 0 | 10 |

In some examples $H_2O_2$ was used in order to convert the resulting phosphine containing polymeric particles into the corresponding phosphine oxide containing polymeric particles. The procedure used for $H_2O_2$ treatment was the following: The $H_2O_2$ solution in water (35% w/w) was added to the reaction mixture 30 minutes after the addition of the amine. Then, the reaction mixture was kept under stirring for additional 30 minutes and finally the volatile compounds were removed following the procedure described above. Examples are shown in Table 4.

TABLE 4

| Example | Stirring speed (rpm) | Polyol Type | g | THPX Type | g | Base Type | g | Amine Type | g | EtOH ml | Water ml | $H_2O_2$ ml |
|---|---|---|---|---|---|---|---|---|---|---|---|---|
| 35 | 1000 | Polyol A | 100 | THPS | 10 | KOH | 2.4 | $NH_3$ (30-33%) | 2.4 | 15 | 10 | 2.6 |
| 36 | 1000 | Polyol A | 100 | THPS | 10 | KOH | 2.4 | $NH_3$ (30-33%) | 2.4 | 15 | 10 | 1.3 |
| 37 | 1000 | Polyol A | 100 | THPS | 10 | KOH | 2.4 | $NH_3$ (30-33%) | 2.4 | 15 | 10 | 0.6 |

| Example | rpm | Polyol Type | g | THPX Type | g | Base Type | g | Amine Type | g | EtOH ml | Water ml | Shear process rpm | Time (min) |
|---|---|---|---|---|---|---|---|---|---|---|---|---|---|
| 38 | 1000 | Polyol G | 500 | THPS | 100 | KOH | 24.1 | $NH_3$ (28-30%) | 56.38 | 100 | 100 | 5000 | 25 |

In an additional example the modified polymer polyol obtained following the general two-step process was subjected to a shear process using a Dispermat LC55 equipped with a bead mill accesory. The shear process was done at 5000 rpm during 25 min.

Resulting polymer modified polyols showed the following viscosity (mPa s).

TABLE 5

| Example | Viscosity (mPa s) |
|---|---|
| 1 | 1338 |
| 2 | 1351 |
| 3 | 1336 |
| 4 | 1439 |
| 5 | 1395 |
| 6 | 2331 |
| 7 | 1154 |
| 8 | 845 |
| 9 | 1355 |
| 10 | 6317 |
| 11 | 2812 |
| 12 | 2751 |
| 13 | 1413 |
| 14 | 10572 |
| 15 | 4067 |
| 16 | 1568 |
| 17 | 1208 |
| 18 | 1292 |
| 19 | 2016 |
| 20 | 1731 |
| 21 | 8290 |
| 22 | 3005 |
| 23 | 1208 |
| 24 | 2494 |
| 25 | 1663 |
| 26 | 5172 |
| 27 | 7400 |
| 28 | 4449 |
| 29 | 2891 |
| 30 | 6870 |
| 31 | 2812 |
| 32 | 1377 |
| 33 | 1430 |
| 34 | 1116 |

TABLE 5-continued

| Example | Viscosity (mPa s) |
|---|---|
| 35 | 1218 |
| 36 | 1245 |
| 37 | 1332 |
| 38 | 6381 |

B. Modified Polymer Polyols Obtained Following the General One-Pot Process.

The hydroxyalkylphosphonium salt (THPX) was diluted with water and the resulting solution was added to the polyol, previously charged into the reactor, under vigorous stirring. The stirring was maintained for 10 minutes and then the amine was added. The reaction was kept under stirring for 1 hour and then the volatile compounds were distilled off under reduced pressure following different steps:

1.—The pressure was reduced, at room temperature, bellow 10 mbar and kept at these conditions for 30 min.
2.—Temperature was raised to 60° C., maintaining the pressure below 10 mbar, and was kept at these conditions for 15 min.
3.—Temperature was raised to 80° C., maintaining the pressure below 10 mbar, and was kept at these conditions for 15 min.
4.—Temperature was raised to 100° C., maintaining the pressure below 10 mbar, and was kept at these conditions for 15 min.
5.—Temperature was raised to 120° C., maintaining the pressure below 10 mbar, and was kept at these conditions for 30 min.
6.—Finally the pressure was increased to atmospheric pressure and the product was collected.

The resulting product is a polyol which has finely dispersed particles of a polymer with high content of nitrogen and phosphorous. Some examples are showed in Table 6.

TABLE 6

| Example | Stirring speed (rpm) | Polyol Type | g | THPX Type | g | Amine Type | ml | Water ml |
|---|---|---|---|---|---|---|---|---|
| 39 | 1000 | Polyol A | 500 | THPS | 100 | $NH_3$ (31-33%) | 32.5 | 50 |
| 40 | 1000 | Polyol A | 500 | THPC | 100 | $NH_3$ (31-33%) | 37.3 | 50 |
| 41 | 1000 | Polyol A | 500 | THPS | 50 | DETA | 24.4 | 50 |
| 42 | 1000 | Polyol A | 500 | THPS | 50 | DETA | 30.6 | 50 |
| 43 | 1000 | Polyol B | 100 | THPS | 10 | DETA | 4.9 | 10 |
| 44 | 1000 | Polyol C | 100 | THPS | 10 | DETA | 4.9 | 10 |
| 45 | 1000 | Polyol C | 100 | THPS | 10 | DETA | 6.1 | 10 |

The resulting polymer modified polyols showed the following viscosity (mPa s) and acidity (mgKOH/g) values, as summarized in Table 7.

TABLE 7

| Example | Viscosity (mPa s) | Acid number (mgKOH/g) |
| --- | --- | --- |
| 39 | 1473 | 31.1 |
| 40 | 3916 | 24.7 |
| 41 | 2909 | 16.5 |
| 42 | 2815 | 23.6 |
| 43 | 4216 | 14.3 |
| 44 | 2499 | 10.8 |
| 45 | 2008 | 18.4 |

When the polyols were prepared using ammonia as amine, a further treatment with a basic compound was performed, in order to reduce the acidity of the final polymer polyol. The neutralization treatment was as following:

The polymer polyol samples were placed in a reactor at 80° C. A solution of a basic compound in water was poured into the reactor and the mixture was stirred for 30 minutes in order to complete the reaction. After that time the volatiles were removed under vacuum at 120° C. The polyol was filtered through a ceramic filter (average pore diameter 16 to 40 microns) in order to remove the salts formed as a result of the neutralization reaction.

Examples of neutralization are showed in Table 8

TABLE 8

| | | | Basic solution | | |
| --- | --- | --- | --- | --- | --- |
| | Polyol | | Base | | H$_2$O |
| Example | Type | g | Type | g | (g) |
| 46 | 38 | 402.8 | KOH | 12.6 | 40 |
| 47 | 39 | 603.5 | KOH | 15.6 | 60 |

The resulting polymer modified polyols after neutralization treatment showed the following viscosity (mPa s) and acidity (mgKOH/g) as summarized in Table 9.

TABLE 9

| Example | Viscosity (mPa s) | Acid number (mgKOH/g) |
| --- | --- | --- |
| 46 | 1330 | 1.3 |
| 47 | 3394 | 1.5 |

C. Oxidation Temperature

The oxidation temperature of the example 6 was measured and compared with the oxidation temperature of the polyol A, used as base polyol for that example 6. The values obtained are shown in Table 10.

TABLE 10

| Polyol | Oxidation temperature (° C.) |
| --- | --- |
| Polyol A | 157 |
| Example 6 | 185 |

A significant increase in the oxidation temperature of the polyol obtained according to the invention is observed, when compared to a conventional polyol. High oxidation temperature values indicate a higher oxidation resistance, which is related to a higher polyol stability. Such stable polyols prevent the undesired phenomenon of scorching in the polyurethane foams obtained therefrom.

D. Phosphorous and Nitrogen Content of Particles.

The nitrogen and phosphorous content of the particles dispersed in example 32 was determined. The particles were separated from the polyol using the following procedure:

The polyol is diluted 2 times with ethanol and it is homogenized. A sample of the resulting product is centrifuged at 15000 rpm for 1 h using a Sorvall™ Legend™ X1 Centrifuge Series. The supernatant is discarded with a pipette and the solid is whashed with fresh ethanol and centrifuged again at 15000 rpm for 1 h. The supernatant is discarded again and the solid is dried overnight at room temperature under vacuum in a vacuum oven in order to remove the methanol that could remain in the solid.

The phosphorous and nitrogen content of the solid obtained after centrifugation was analyzed. The values obtained are shown in Table 11.

TABLE 11

| Polyol | Phosphorous (wt %) | Nitrogen (wt %) |
| --- | --- | --- |
| Example 32 | 16.30 | 22.25 |

E. Polyurethane Foams

Foam cup tests were done with examples 1-38 and 41-47 in order to verify that all the synthesized polyols show the proper reactivity and are valid for polyurethane foam applications. Tests were done using as reference the following formulation:

TABLE 12

| | p.b.w |
| --- | --- |
| Polyol E | 25 |
| Polyol A | 75 |
| Total Water | 3 |
| DEOA | 0.50 |
| Tegoamin-33 | 0.15 |
| Tegoamin ® BDE | 0.05 |
| Ortegol ®-204 | 1.00 |
| Kosmos 29 | 0.15 |
| Tegostab ® B-8681 | 0.30 |
| TDI-80 | Index 100 |

For the testing purposes the polyol A was completely replaced by the different polyols synthesized in the different examples.

The procedure was done as follows:

A batch was prepared mixing water, amines, DEOA and Ortegol® 204 according to the foam formulation. Polyols and silicone were mixed for 50 seconds at 5000 rpm into a cup. The corresponding quantity of batch was added to the mixture of polyols and silicone, and after 5 seconds the tin octoate was added and stirred for 5 more seconds. Them the isocyanate was added and stirring was maintained for 10 seconds.

The mixture was allowed to react in the cup at 23° C. for a period of 5 minutes, rise profile was monitored by a Foamat equipment.

In all cases (examples 1-38 and 41-47), the samples showed a rise profile adequate for the use of the polyol in polyurethane foam applications.

F. Flexible Polyurethane Foams—Burning Behavior

Working and comparative foam samples were prepared following the general foaming method described below:

A batch was prepared mixing water, amines, DEOA and Ortegol® 204 according to the foam formulation shown in Table 13. Polyols and silicone were mixed for 50 seconds at 5000 rpm into a cardboard glass. The corresponding quantity of batch was added to the mixture, and after 5 seconds the tin octoate was added and stirred for 5 more seconds. Then the isocyanate was added and stirring was maintained for 10 seconds.

The resulting mixture was poured into a 24×24×15 cm aluminium mold protected by kraft paper at 23° C. and the mixture was allowed to react in the mold for a period of 5 minutes, rise profile was monitored by a Foamat equipment. The resulting foam was removed from the mold, and allowed to cure in an oven at 100° C. for 15 minutes. After that curing step the foam was storaged at 23° C. and 50% relative humidity for at least 24 h.

Comparative example 1 and working examples 1, 2, 3 and 5 were tested under MVSS302 standard. The working examples, that were evaluated, passed the test, whereas the comparative example burned.

TABLE 13

| | Comparative example 1 | Working examples | | | | | |
|---|---|---|---|---|---|---|---|
| | | 1 | 2 | 3 | 4 | 5 | 6 |
| | | | | p.b.w | | | |
| Polyol E | 25 | 25 | 25 | 25 | 25 | 25 | 25 |
| Polyol A | 75 | 0 | 37.5 | 0 | 18.75 | 37.75 | 56.25 |
| Polyol example 6 | 0 | 75 | 37.5 | 0 | 0 | 0 | 0 |
| Polyol example 25 | 0 | 0 | 0 | 75 | 56.25 | 37.25 | 18.75 |
| Total Water | 3 | 3 | 3 | 3 | 3 | 3 | 3 |
| DEOA | 0.50 | 0.50 | 0.50 | 0.50 | 0.50 | 0.50 | 0.50 |
| Tegoamin ®-33 | 0.15 | 0.15 | 0.15 | 0.15 | 0.15 | 0.15 | 0.15 |
| Tegoamin ® BDE | 0.05 | 0.05 | 0.05 | 0.05 | 0.05 | 0.05 | 0.05 |
| Ortegol ®-204 | 1.00 | 1.00 | 1.00 | 1.00 | 1.00 | 1.00 | 1.00 |
| Kosmos ® 29 | 0.15 | 0.15 | 0.15 | 0.15 | 0.15 | 0.15 | 0.15 |
| Tegostab ® B-8681 | 0.30 | 0.30 | 0.30 | 0.30 | 0.30 | 0.30 | 0.30 |
| TDI-80 | Index 100 | Index 100 | Index 100 | Index 100 | Index 100 | Index 100 | Index 100 | p.b.w. means part-by-weight.

Burning behavior of foam examples:
Comparative example 1: burning speed 121 mm/min, does not comply with MVSS302
Working examples 1-3 and 5: Combustion stops before first mark, the foams comply with MVSS302 type A The phosphorous content of the foams prepared in the comparative example 1 and in the working examples 3, 4, 5 and 6 was determined by ICP-OES.

LOI and Total Heat Release (obtained from cone calorimeter tests) were measured for the comparative example 1 and the working examples 3 to 6.

TABLE 14

| | Comparative Example | Working example 3 | Working example 4 | Working example 5 | Working example 6 |
|---|---|---|---|---|---|
| Phosphorous (wt %) | 0 | 0.92 | 0.68 | 0.47 | 0.24 |
| LOI (%) | 19.8 | 25.1 | 24.2 | 23.0 | 21.4 |
| Total Heat Released (kW/m2) | 19.1 | 16.8 | 16.7 | 17.3 | 17.5 |

G. Rigid Polyurethane Foams—Burning Behavior

Working and comparative foam samples were prepared following the general foaming method described below:

A batch was prepared mixing polyol, water, Jeffcat® DMCHA, Tegoamin-33, Tegostab® B 8404 and Solkane® 365/227 according to the foam formulation shown in the table 15. All the components of the batch were mixed for 60 seconds at 500 rpm into a cardboard glass. Then the isocyanate was added and the mixture was stirred for 10 seconds at 5000 rpm.

The resulting mixture was poured into a 24×24×15 cm aluminium mold protected by kraft paper at 23° C. and the mixture was allowed to react in the mold for a period of 5 minutes, rise profile was monitored by a Foamat equipment. The resulting foam was removed from the mold, and storaged at 23° C. and 50% relative humidity for at least 24 hours.

TABLE 15

| | Comparative example 2 | Working example 7 |
|---|---|---|
| | p.b.w | |
| Polyol G | 100 | 0 |
| Polyol Example 38 | 0 | 100 |

TABLE 15-continued

| | Comparative example 2 | Working example 7 |
|---|---|---|
| | p.b.w | |
| Total Water | 4 | 4 |
| Jeffcat ® DMCHA | 1.2 | 1.2 |
| Tegoamin ®-33 | 1.6 | 1.6 |
| Tegostab ® B 8404 | 0.05 | 0.05 |
| Solkane ® 365/227 | 15 | 15 |
| Suprasec ® 5025 | Index 105 | Index 105 | p.b.w. means part-by-weight.

Polyurethane foam thus obtained were tested under ASTM D2863-97 and ASTM D3014-11 standard test methods.

The values obtained for the foams of comparative example 2 and working example 7 are shown in table 16

TABLE 16

| | ASTM D2863-97 | ASTM D3014 - 11 | |
|---|---|---|---|
| | LOI (%) | Weight retention (wt %). | Extinguish time (sec). |
| Comparative example 2 | 19.2 ± 0.1 | 21 ± 1 | 22 ± 1 |
| Working example 7 | 21.3 ± 0.1 | 28 ± 1 | 18 ± 1 |

Additionally, density and thermal conductivity of the samples were measured.

Thermal conductivity was measured following the ASTM C518-17 standard test method.

Density was measured following the UNE EN ISO 845 standard test method.

The values obtained are shown in table 17.

TABLE 17

|  | UNE EN ISO 845 Density ($Kg/m^3$) | ASTM C518 - 17 Thermal conductivity ($W/m° C.$) |
|---|---|---|
| Comparative example 2 | 26.3 | 0.0274 |
| Working example 7 | 24.6 | 0.0240 |

The use of the modified polymer polyol has a positive impact in the thermal conductivity of the foam.

The invention claimed is:

1. A modified polymer polyol comprising at least one base polyol and a stable dispersion of polymeric particles in the at least one base polyol, the modified polymer polyol being obtainable by a process comprising the preparation of the polymeric particles in the presence of the at least one base polyol by a polycondensation reaction of
   a) at least one compound bearing at least one basic-nitrogen atom characterized by the presence in the molecule of at least one hydrogen atom attached to a nitrogen atom; with
   b) at least one compound bearing a phosphorous atom selected from the group consisting of b1) a compound bearing a phosphine group and b2) a condensation product from at least one compound of formula (I) or at least one compound of formula (II) and at least one compound bearing at least one basic nitrogen atom, wherein:
   i) b1) the compound bearing a phosphine group is selected from the group consisting of at least one hydroxyalkylphosphine of formula (I), at least one hydroxyalkylphosphonium salt of formula (II), at least one hydroxyalkylphosphine oxide of formula (III) and a combination thereof;
   and
   ii) b2) the condensation product is at least one condensation product from at least one hydroxyalkylphosphine of formula (I) or at least one hydroxyalkylphosphonium salt of formula (II) and a) the least one compound bearing at least one basic-nitrogen atom characterized by the presence in the molecule of at least one hydrogen atom attached to a nitrogen atom;
   wherein
   A) the hydroxyalkylphosphine of formula (I) is as follows:

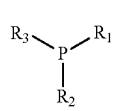

wherein $R_1$, $R_2$ and $R_3$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$arylalkyl, linear or branched hydroxy $C_1$-$C_6$ alkyl, $C_7$-$C_{18}$ alkylaryl and a radical of formula (IV)

wherein $R_5$ and $R_6$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$arylalkyl, linear or branched hydroxy $C_1$-$C_6$ alkyl, and $C_7$-$C_{18}$ alkylaryl; and the wavy line means the attachment point of the radical of formula (IV) to the phosphorus atom;
with the proviso that at least one of $R_1$, $R_2$ and $R_3$ is a radical of formula (IV);
B) the hydroxyalkylphosphonium salt of formula (II) is as follows:

wherein $R_1$, $R_2$, $R_3$ and $R_4$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl and a radical of formula (IV):

wherein $R_5$ and $R_6$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, and $C_7$-$C_{18}$ alkylaryl; and the wavy line means the attachment point of the radical of formula (IV) to the phosphorus atom; and $X^-$ represents any anion suitable for compensate the positive charge of the phosphonium cation;
with the proviso that at least one of $R_1$, $R_2$, $R_3$ and $R_4$ is a radical of formula (IV); and
C) the hydroxyalkylphosphine oxide of formula (III) is as follows:

wherein $R_1$, $R_2$ and $R_3$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl and a radical of formula (IV):

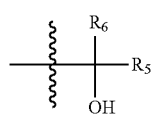

(IV)

wherein $R_5$ and $R_6$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, and $C_7$-$C_{18}$ alkylaryl; and the wavy line means the attachment point of the radical of formula (IV) to the phosphorus atom;

with the proviso that at least one of $R_1$, $R_2$ and $R_3$ is a radical of formula (IV);

and wherein the compound bearing at least one basic-nitrogen atom is selected from those compounds of formula (V) or formula (VI);

wherein the compounds of formula (V) are as follows

(V)

wherein $R_7$ is —H, —$C_1$-$C_3$ alkyl, $C_1$-$C_3$ alkyl-CO—, $NH_2$—CO—, —$(CH_2)_n$—$NH_2$, —CN, —$NH_2$, —$SO_2NH_2$, cyclohexyl, phenyl, —$SO_2OH$ or —$NHCONHNH_2$; wherein n is an integer from 1-18; and the compounds of formula (VI) are as follows:

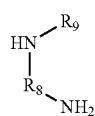

(VI)

wherein $R_8$ is selected from NH=C<  and O=C<; S=C<; and $R_9$ is selected from H, —CN, —$NH_2$, —$CONH_2$, —$CONHCONH_2$, and —$CONHCONHCONH_2$, wherein "<" indicates two single bonds that attach to either nitrogen atom in formula (VI).

2. The modified polymer polyol according to claim 1 being obtainable by a process comprising the preparation of the polymeric particles in the presence of at least one base polyol by a polycondensation reaction of a) the at least one compound bearing at least one basic-nitrogen atom characterized by the presence in the molecule of at least one hydrogen atom attached to a nitrogen atom, and is selected from those compounds of formula (V) or formula (VI), with at least one compound b1) selected from the group consisting of at least one hydroxyalkylphosphine of formula (I), at least one hydroxyalkylphosphonium salt of formula (II), at least one hydroxyalkylphosphine oxide of formula (III) and a combination thereof.

3. The modified polymer polyol according to claim 1 being obtainable by a process comprising the preparation of the polymeric particles, in the presence of at least one base polyol, by a polycondensation reaction of:

a) at least one compound bearing at least one basic-nitrogen atom with a compound of formula (I), wherein the compound of formula (I) is prepared by reacting at least one hydroxylalkylphosphonium salt of formula (II) with a base.

4. The modified polymer polyol according to claim 1 being obtainable by a process comprising the preparation of the polymeric particles in the presence of at least one base polyol by a polycondensation reaction of:

a) the at least one compound bearing at least one basic-nitrogen atom characterized by the presence in the molecule of at least one hydrogen atom attached to a nitrogen atom and is selected from those compounds of formula (V) or formula (VI), with at least one condensation product b2) from a hydroxyalkylphosphine of formula (I) or a hydroxyalkylphosphonium salt of formula (II) and at least one compound bearing at least one basic-nitrogen atom characterized by the presence in the molecule of at least one hydrogen atom attached to a nitrogent and is selected from those compounds of formula (V) or formula (VI).

5. The modified polymer polyol according to claim 1, wherein in formula (I) $R_1$, $R_2$ and $R_3$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl and a radical of formula (IV); and wherein $R_5$ and $R_6$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl; with the proviso that at least one of $R_1$, $R_2$ and $R_3$ is a radical of formula (IV);

in formula (II) $R_1$, $R_2$, $R_3$ and $R_4$ are each independently selected from H, linear or branched $C_1$-$C_6$ alkyl, $C_3$-$C_6$ cycloalkyl, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl and a radical of formula (IV); and wherein $R_5$ and $R_6$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl; with the proviso that at least one of $R_1$, $R_2$ and $R_3$ is a radical of formula (IV); and wherein X— is a monovalent, bivalent or trivalent ligand selected from chloride, bromide, iodide, sulphate, phosphate, hydrogen phosphate, dihydrogen phosphate, hydroxyde, acetate, oxalate and citrate; and c) in formula (III) $R_1$, $R_2$ and $R_3$ are each independently selected from H, linear or branched $C_1$-$C_{18}$ alkyl, $C_3$-$C_{18}$)cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl and a radical of formula (IV); and wherein $R_5$ and $R_6$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl; with the proviso that at least one of $R_1$, $R_2$ and $R_3$ is a radical of formula (IV).

6. The modified polymer polyol according to claim 1, wherein
all hydroxyalkylphosphines of formula (I) are selected from tri(hydroxymethyl)phosphine, bis-(hydroxymethyl)-methyl phosphine, bis-(hydroxymethyl)-ethyl phosphine, bis(hydroxymethyl) propyl phosphine, bis-(hydroxymethyl)-butyl phosphine, bis(hydroxymethyl) pentyl phosphine, bis(hydroxymethyl) hexyl phosphine, (hydroxymethyl)-dimethyl phosphine, and (hydroxymethyl)-methyl-ethyl phosphine;
all hydroxyalkylphosphonium salts of formula (II) are selected from tetrakis(hydroxymethyl) phosphonium chloride (THPC), tetrakis(hydroxymethyl) phosphonium sulphate (THPS), tetrakis(hydroxymethyl) phosphonium phosphate (THPP (3:1)), tetrakis(Hydroxymethyl)phosphonium monohydrogen phosphate (THPP (2:1)), tetrakis(Hydroxymethyl)phosphonium dihydrogen phosphate (THPP (1:1)), tetrakis(hydroxymethyl) phosphonium hydroxide (THPOH), tetrakis(hydroxymethyl) phosphonium oxalate (THPOx) and tetrakis(hydroxymethyl) phosphonium acetate (THPA); and
all hydroxyalkylphosphine oxides of formula (III) is tris-hydroxymethylphosphine oxide.

7. The modified polymer polyol according to claim 1, wherein the compound bearing at least one basic-nitrogen atom characterized by the presence in the molecule of at least one hydrogen atom attached to a nitrogen atom and is selected from those compounds of formula (V) wherein $R_7$ is selected from H, methyl, —CN, $CH_3CO$—, $NH_2$—CO—; and those of formula (VI) wherein $R_8$ is selected from O=C<; S=C<; and $R_9$ is H.

8. The modified polymer polyol according to claim 1, wherein the polymeric particles in the at least one base polyol have a phosphorous content from 13 to 35 wt %; and a nitrogen content from 7 to 30 wt %.

9. A process for producing a modified polymer polyol comprising at least one base polyol and an stable dispersion of polymeric particles in the at least one base polyol, the process comprising the preparation of the polymeric particles in the presence of the at least one base polyol by a polycondensation reaction of
a) at least one compound bearing at least one basic-nitrogen atom characterized by the presence in the molecule of at least one hydrogen atom attached to a nitrogen atom, the compound bearing at least one basic-nitrogen atom is selected from those compounds of formula (V) or formula (VI); with
b) at least one compound bearing a phosphorous atom selected from the group consisting of b1) a compound bearing a phosphine group and b2) a condensation product from at least one hydroxyalkylphosphine of formula (I) or at least one hydroxyalkylphosphine of formula (II) and a) the at least one hydroxylalkylphosphonium salt of formula (II) and a) the at least one compound bearing at least one basic-nitrogen atom, wherein:
i) the at least one compound b1) is selected from the group consisting of at least one hydroxyalkylphosphine of formula (I), at least one hydroxyalkylphosphonium salt of formula (II), at least one hydroxyalkylphosphine oxide of formula (III) and a combination thereof; and
ii) the at least one condensation product b2) is at least one condensation product from a hydroxyalkylphosphonium salt of formula (II) and a) the at least one compound bearing at least one basic-nitrogen atom characterized by the presence in the molecule of at least one hydrogen atom attached to a nitrogen atom and is selected from those compounds of formula (V) or formula (VI);
wherein the at least one hydroxyalkylphosphine of formula (I), the at least one hydroxyalkylphosphonium salt of formula (II), and the at least one hydroxyalkylphosphine oxide of formula (III)
wherein
A) the at least one hydroxyalkylphosphine of formula (I) is as follows:

wherein $R_1$, $R_2$ and $R_3$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl and a radical of formula (IV)

wherein $R_5$ and $R_6$ are each independently selected from H, linear or branched $C_1$-$C_{18}$ alkyl, $C_3$-$C_{18}$ cycloalkyl, linear or branched $C_2$-$C_{18}$ aryl, $C_7$-$C_{18}$ arylalkyl, linear or branched hydroxy $C_1$-$C_6$ alkyl, $C_7$-$C_{18}$ alkylaryl; and the wavy line means the attachment point of the radical of formula (IV) to the phosphorus atom;
with the proviso that at least one of $R_1$, $R_2$ and $R_3$ is a radical of formula (IV);
B) the at least one hydroxyalkylphosphonium salt of formula (II) is as follows:

wherein $R_1$, $R_2$, $R_3$ and $R_4$ are each independently selected from H, linear or branched $C_1$-$C_{18}$ alkyl, $C_3$-$C_{18}$ cycloalkyl, linear or branched $C_2$-$C_{18}$ alkenyl, $C_6$-$C_{18}$ aryl, $C_7$-$C_{18}$ arylalkyl, linear or branched hydroxy $C_1$-$C_6$ alkyl, $C_7$-$C_{18}$ alkylaryl and a radical of formula (IV):

wherein R$_5$ and R$_6$ are each independently selected from H, linear or branched C$_1$-C$_{18}$ alkyl, C$_3$-C$_{18}$ cycloalkyl, linear or branched C$_2$-C$_{18}$ alkenyl, C$_6$-C$_{18}$ aryl, C$_7$-C$_{18}$ arylalkyl, linear or branched hydroxy C$_1$-C$_6$ alkyl, C$_7$-C$_{18}$ alkylaryl; and the wavy line means the attachment point of the radical of formula (IV) to the phosphorus atom; and X$^-$ represents any anion suitable for compensate the positive charge of the phosphonium cation;

with the proviso that at least one of R$_1$, R$_2$, R$_3$ and R$_4$ is a radical of formula (IV); and C) the at least one hydroxyalkylphosphine oxide of formula (III) is as follows:

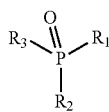

(III)

wherein R$_1$, R$_2$ and R$_3$ are each independently selected from H, linear or branched C$_1$-C$_{18}$ alkyl, C$_3$-C$_{18}$ cycloalkyl, linear or branched C$_2$-C$_{18}$ alkenyl, C$_6$-C$_{18}$ aryl, C$_7$-C$_{18}$ arylalkyl, linear or branched hydroxy C$_1$-C$_6$ alkyl, C$_7$-C$_{18}$ alkylaryl and a radical of formula (IV):

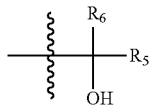

(IV)

wherein R$_5$ and R$_6$ are each independently selected from H, linear or branched C$_1$-C$_{18}$ alkyl, C$_3$-C$_{18}$ cycloalkyl, linear or branched C$_2$-C$_{18}$ alkenyl, C$_6$-C$_{18}$ aryl, C$_7$-C$_{18}$ arylalkyl, linear or branched hydroxy C$_1$-C$_6$ alkyl, C$_7$-C$_{18}$ alkylaryl; and the wavy line means the attachment point of the radical of formula (IV) to the phosphorus atom;

with the proviso that at least one of R$_1$, R$_2$ and R$_3$ is a radical of formula (IV);

and wherein a) the at least one compound bearing at least one basic-nitrogen atom is selected from compounds of a formula (V) or a formula (VI);

wherein the compounds of formula (V) are as follows

R$_7$—NH$_2$  (V)

wherein R$_7$ is —H, —C$_1$-C$_3$ alkyl, C$_1$-C$_3$ alkyl-CO—, NH$_2$—CO—, —(CH$_2$)$_n$—NH$_2$, —CN, —NH$_2$, —SO$_2$NH$_2$, cyclohexyl, phenyl, —SO$_2$OH or —NHCONHNH$_2$; wherein n is an integer from 1-18;

and the compounds of formula (VI) are as follows:

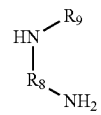

(VI)

wherein R$_8$ is selected from NH=C< and O=C<; S=C<; and R$_9$ is selected from H, —CN, —NH$_2$, —CONH$_2$, —CONHCONH$_2$, and —CONHCONHCONH$_2$.

10. The process according to claim 9, comprising the reaction of at least one hydroxyalkylphosphine of formula (I) as defined in claim 1 with at least one compound bearing at least one basic-nitrogen atom characterized by the presence in the molecule of at least one hydrogen atom attached to a nitrogen atom and is selected from those compounds of formula (V) or formula (VI); in the presence of at least one polyol and water; to obtain a modified polymer polyol comprising a polymeric particle dispersion.

11. The process according to claim 10, further comprising an additional previous step of reacting at least one hydroxyalkylphosphonium salt of formula (II) with at least one base to obtain the corresponding at least one hydroxyalkylphosphine of formula (I).

12. The process according to claim 9, comprising the polycondensation reaction of at least one compound bearing at least one basic-nitrogen atom characterized by the presence in the molecule of at least one hydrogen atom attached to a nitrogen atom and is selected from those compounds of formula (V) or formula (VI), and at least one condensation product b2) from at least one hydroxyalkylphosphine of formula (I) or at least one hydroxyalkylphosphonium salt of formula (II) and at least one compound bearing at least one basic-nitrogen atom characterized by the presence in the molecule of at least one hydrogen atom attached to a nitrogen atom and is selected from those compounds of formula (V) or formula (VI).

13. The process according to claim 9, further comprising an additional step of oxidizing the polymeric particles dispersed in the at least one base polyol by introduction of at least one oxidizing agent once the polycondensation reaction has occurred.

14. A process for preparing a polyurethane material, the process comprises reacting a polyisocyanate with an isocyanate-reactive component which comprises at least one modified polymer polyol as defined in claim 1.

15. A polyurethane material obtainable by the process according to claim 14.

* * * * *